(12) United States Patent
Komiyama et al.

(10) Patent No.: US 9,567,183 B2
(45) Date of Patent: Feb. 14, 2017

(54) SHEET PROCESSING APPARATUS AND IMAGE FORMING SYSTEM HAVING THE SAME

(71) Applicants: Daiki Komiyama, Yamanashi-ken (JP); Takuya Katayama, Yamanashi-ken (JP)

(72) Inventors: Daiki Komiyama, Yamanashi-ken (JP); Takuya Katayama, Yamanashi-ken (JP)

(73) Assignees: CANON FINETECH INC., Misato-shi, Saitama-ken (JP); NISCA CORPORATION, Minamikoma-gun, Yamanashi-ken (JP)

( * ) Notice: Subject to any disclaimer, the term of this patent is extended or adjusted under 35 U.S.C. 154(b) by 107 days.

(21) Appl. No.: 14/570,692

(22) Filed: Dec. 15, 2014

(65) Prior Publication Data

US 2015/0165809 A1    Jun. 18, 2015

(30) Foreign Application Priority Data

Dec. 16, 2013 (JP) .................................. 2013-259469
Dec. 17, 2013 (JP) .................................. 2013-260097
Dec. 17, 2013 (JP) .................................. 2013-260098

(51) Int. Cl.
*B65H 37/04* (2006.01)
*B42B 5/08* (2006.01)
(Continued)

(52) U.S. Cl.
CPC ................. *B65H 37/04* (2013.01); *B42B 5/08* (2013.01); *B65H 29/125* (2013.01); *B65H 29/14* (2013.01);
(Continued)

(58) Field of Classification Search
CPC ............ B42B 5/08; G03G 2215/00848; G03G 2215/00936; G03G 15/6544; B60B 33/025; B65H 37/04; B65H 2301/43828; B65H 2301/4213; B65H 2402/10; B65H 2402/441; B65H 2402/442; B65H 2404/1424; B65H 2407/21; B65H 2801/27; B65H 33/08; B65H 31/34; B65H 31/3081; B65H 31/3027; B65H 31/24; B65H 31/10; B65H 29/14; B65H 29/125
(Continued)

(56) References Cited

U.S. PATENT DOCUMENTS 7,823,868 B2 *  11/2010  Taki .......................... B42B 4/00
                                                         270/58.07
7,950,642 B2 *   5/2011  Taki .......................... B42B 4/00
                                                         270/32
(Continued)

FOREIGN PATENT DOCUMENTS

JP    2005-096392 A    4/2005
JP    2007-039211 A    2/2007
(Continued)

*Primary Examiner* — Leslie A Nicholson, III
(74) *Attorney, Agent, or Firm* — Manabu Kanesaka

(57) ABSTRACT

To provide a sheet storing apparatus or a sheet processing apparatus which is downsized and slimmed with a structure that a manual setting portion is arranged at an external casing of the sheet storing apparatus or the sheet processing apparatus. An apparatus includes a setting portion for a binding process to be performed on a sheet bundle inserted from the outside, a binding unit which performs the binding process on the sheet bundle inserted to the setting portion, a sheet conveying path which conveys a sheet, and a processing unit which performs a predetermined process on a sheet as being arranged at the sheet conveying path and being moved in a direction intersecting with a conveying direction of the sheet conveyed on the sheet conveying path, and a
(Continued)

movement area of the processing unit in the intersecting direction and the setting portion are overlapped in the intersecting direction.

13 Claims, 25 Drawing Sheets

(51) Int. Cl.
*B65H 31/34* (2006.01)
*B65H 29/12* (2006.01)
*B65H 29/14* (2006.01)
*B65H 31/10* (2006.01)
*B65H 31/24* (2006.01)
*B65H 31/30* (2006.01)
*B65H 33/08* (2006.01)
*G03G 15/00* (2006.01)
*B60B 33/02* (2006.01)

(52) U.S. Cl.
CPC .............. *B65H 31/10* (2013.01); *B65H 31/24* (2013.01); *B65H 31/3027* (2013.01); *B65H 31/3081* (2013.01); *B65H 31/34* (2013.01); *B65H 33/08* (2013.01); *G03G 15/6544* (2013.01); *B60B 33/025* (2013.01); *B65H 2301/4213* (2013.01); *B65H 2301/43828* (2013.01); *B65H 2402/10* (2013.01); *B65H 2402/441* (2013.01); *B65H 2402/442* (2013.01); *B65H 2404/1424* (2013.01); *B65H 2407/21* (2013.01); *B65H 2801/27* (2013.01); *G03G 2215/00848* (2013.01); *G03G 2215/00936* (2013.01)

(58) Field of Classification Search
USPC ...................... 270/58.08, 58.13, 58.19, 58.28
See application file for complete search history.

(56) References Cited

U.S. PATENT DOCUMENTS

| | | | | |
|---|---|---|---|---|
| 2003/0178760 | A1* | 9/2003 | Coombs | .................... B42C 1/12 |
| | | | | 270/58.08 |
| 2011/0033218 | A1* | 2/2011 | Sasahara | ............ G03G 15/6538 |
| | | | | 399/410 |
| 2015/0014913 | A1* | 1/2015 | Obuchi | .................. B65H 31/36 |
| | | | | 270/58.12 |
| 2015/0016922 | A1* | 1/2015 | Obuchi | .................... B42C 1/12 |
| | | | | 412/33 |
| 2015/0166295 | A1* | 6/2015 | Kanemaru | ............. B65H 31/02 |
| | | | | 270/58.08 |
| 2015/0183255 | A1* | 7/2015 | Nakagomi | ............. B65H 37/04 |
| | | | | 412/11 |

FOREIGN PATENT DOCUMENTS

| | | |
|---|---|---|
| JP | 2008-156067 A | 7/2008 |
| JP | 5010526 B2 | 8/2012 |

* cited by examiner

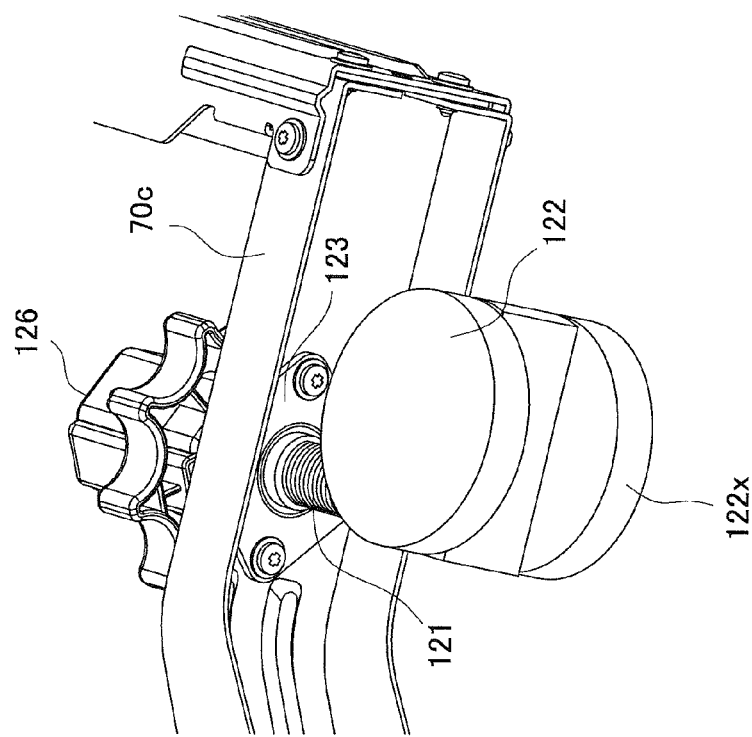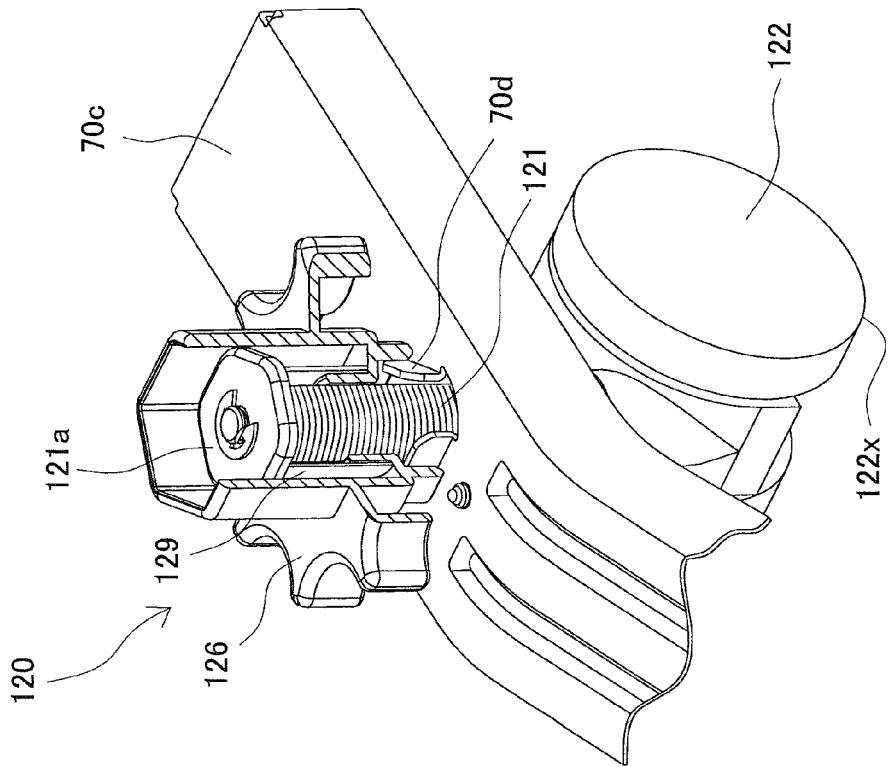

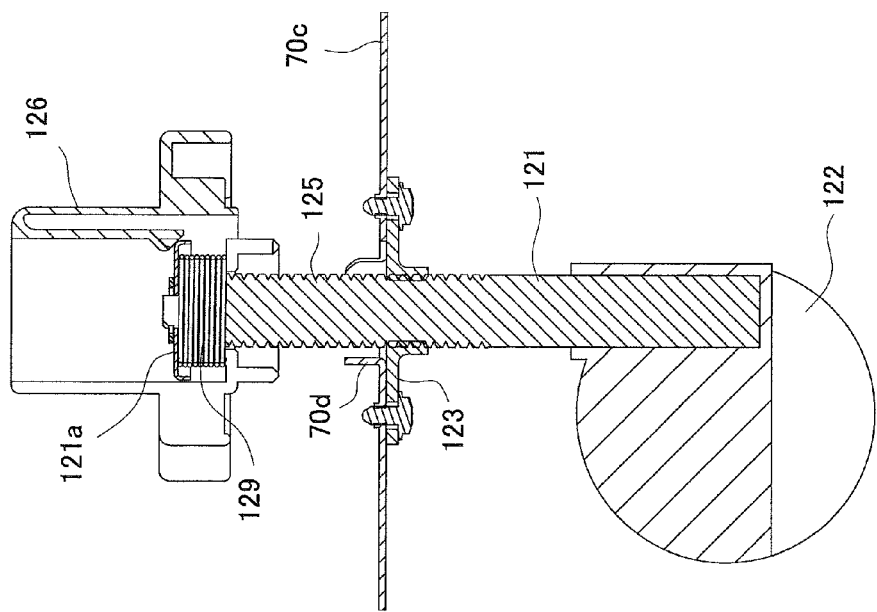
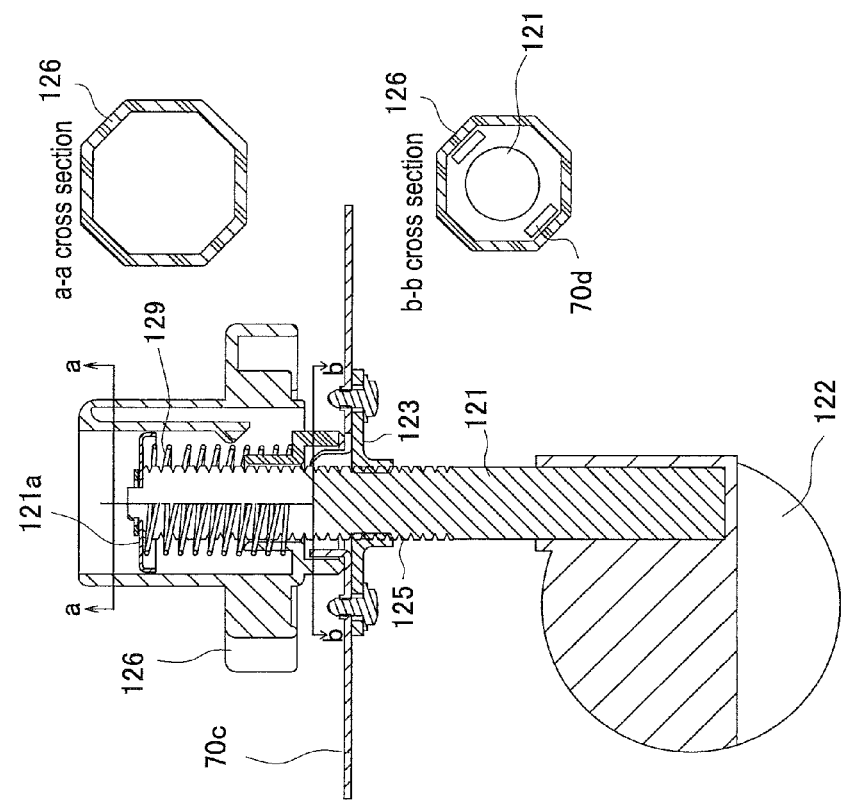

SHEET PROCESSING APPARATUS AND IMAGE FORMING SYSTEM HAVING THE SAME

RELATED APPLICATIONS

The present application is based on, and claims priority from, Japanese Application No. 2013- 259469 filed Dec. 16, 2013; No. 2013- 260097 filed Dec. 17, 2013; and No. 2013-260098 filed Dec. 17, 2013, the disclosure of which is hereby incorporated by reference herein in its entirety.

BACKGROUND OF THE INVENTION

1. Field of the Invention

The present invention relates to a sheet processing apparatus and an image forming system having the sheet processing apparatus.

2. Description of Related Arts

In general, there have been a sheet storing apparatus and a sheet processing apparatus which include a mechanism to perform a binding process on a manually-set sheet bundle with a dedicated manual setting portion arranged outside an apparatus (see Japanese Patent Application Laid-open No. 2008-156067, Japanese Patent Application Laid-open No. 2007-039211, Japanese Patent Application Laid-open No. 2005-096392, and Japanese Patent No. 5010526).

Accordingly, there has been a problem that an apparatus (housing) is upsized as a whole owing to necessity for arranging a space required for a manual setting portion as well as a space arranged in an apparatus main body to be required for a process such as forming a punch hole at sheets, and sorting sheets at differentiating positions in a direction perpendicular to a sheet discharging direction and a space arranged in an apparatus main body to be required for a drive connection mechanism for lifting-lowering a tray.

SUMMARY OF THE INVENTION

The present invention provides a sheet storing apparatus or a sheet processing apparatus which is downsized and slimmed with a structure that a manual setting portion is arranged at an external casing of the sheet storing apparatus or the sheet processing apparatus.

In a structure that a setting face where a sheet bundle on which a binding process is to be performed is inserted from the outside is arranged at an external casing and a processing mechanism which performs a predetermined process on a sheet conveyed into the sheet conveying path is arranged, the processing mechanism and the setting face are arranged as being mutually spaced in a conveying direction or a height direction and a movement area of the processing mechanism in a direction perpendicular to a sheet discharging direction and a sheet placement area of the setting face are arranged to be mutually overlapped in the direction perpendicular to the sheet discharging direction in a superimposed manner.

BRIEF DESCRIPTION OF THE DRAWINGS

FIG. 17 is a perspective view illustrating the frame structure in the apparatus of FIG. 2, FIGS. 18A and 18B are perspective views of an emplacement leg in the apparatus of FIG. 2, while FIG. 18A illustrates an upper face side and FIG. 18B illustrates a lower face side, FIGS. 19A and 19B are sectional views of the emplacement leg in the apparatus of FIG. 2, while FIG. 19A illustrates a locked state and FIG. 19B illustrates a lock-released state, FIGS. 20A to 20C are operational explanatory views of a sheet bundle discharging device, while FIG. 20A illustrates a state that a sheet bundle is located at a binding position on the stack portion, FIG. 20B illustrates a midstream state of conveying the sheet bundle from a processing position to the downstream side, and FIG. 20C illustrates a state right before the sheet bundle is discharged to a stack tray at the downstream side, FIGS. 21A and 21B illustrate structures of binding devices according to the present invention, while FIG. 21A is a structural explanatory view of the stapling unit and FIG. 21B is a structural explanatory view of the press binding unit.

FIGS. 25A and 25B illustrate flows of a sheet discharging mode with the apparatus of FIG. 1, while FIG. 25A is an operational flowchart of a bookbinding sheet discharging mode and FIG. 25B is an operational flowchart of a printout sheet discharging mode.

DETAILED DESCRIPTION OF THE PREFERRED EMBODIMENT

[Image Forming Apparatus]

Figure 1:
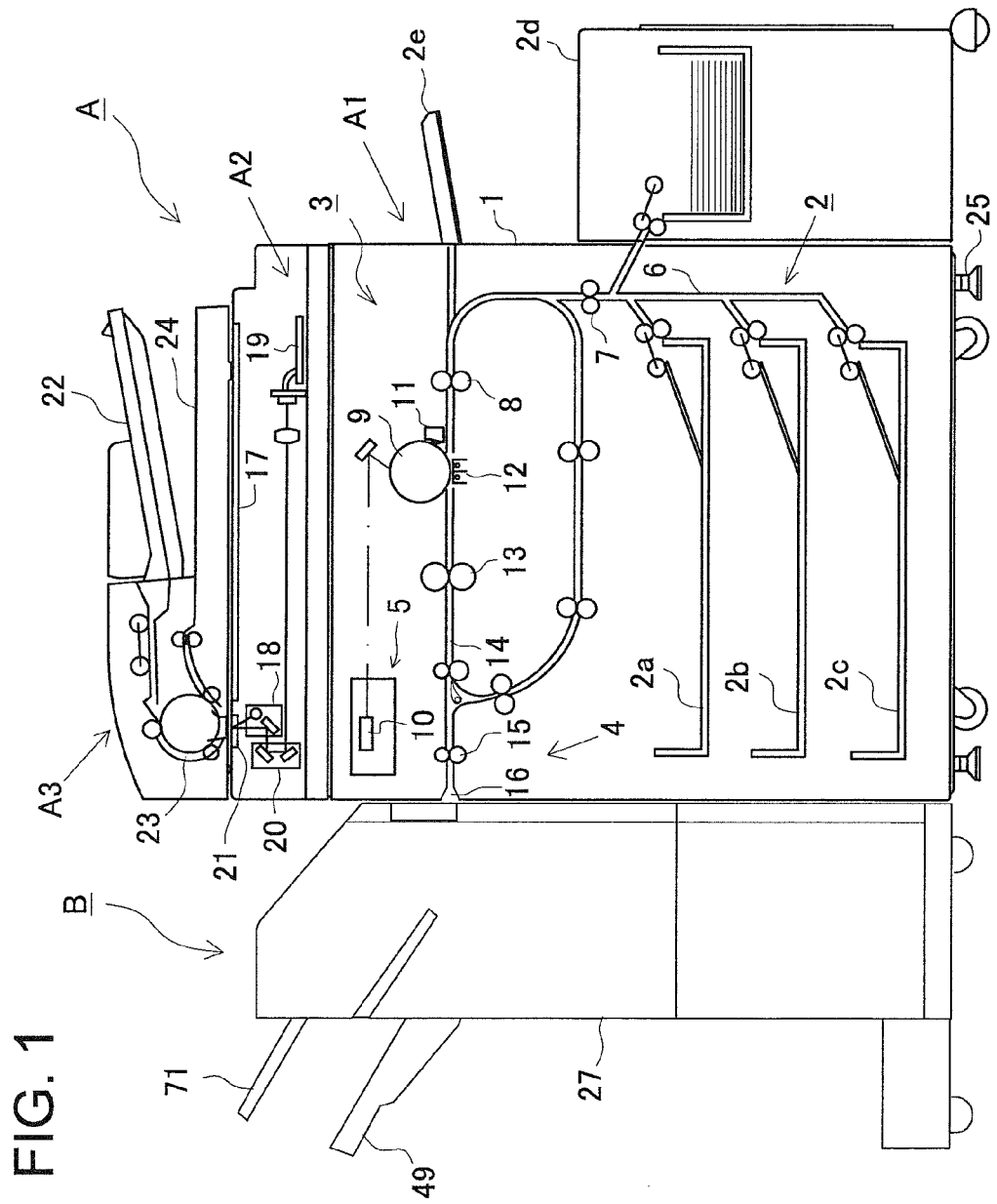
FIG. 1 is an explanatory view of a whole configuration of an image forming system according to the present invention.

Description will be provided on an image forming apparatus A in an image forming system illustrated in FIG. 1. In the drawing, the image forming apparatus A has an electrostatic printing mechanism as including an image forming unit A1, a scanner unit A2, and a feeder unit A3.

Emplacement legs 25 for emplacing on an installation face (e.g., a floor face) are arranged at an image forming apparatus housing 1. Further, the image forming apparatus housing 1 accommodates a sheet feeding portion 2, an image forming portion 3, a sheet discharging portion 4, and a data processing portion 5.

The sheet feeding portion 2 is structured with cassette mechanisms 2a to 2c to store sheets having a plurality of sizes on which images are formed and feeds a sheet having a specified size from a main body controller 90 to a sheet feeding path 6. The plurality of cassette mechanisms 2a to 2c are arranged at the image forming apparatus housing 1 in a detachably attachable manner. Each cassette mechanism contains a separating mechanism to separate stored sheets one by one and a sheet feeding mechanism to feed a sheet. A conveying roller 7 which feeds sheets fed from the plurality of cassette mechanisms 2a to 2c to the downstream side is arranged at the sheet feeding path 6. A pair of resist rollers 8 are arranged at an end of the path so that each sheet is aligned at a leading end thereof.

A large-capacity cassette mechanism 2d and a manual tray 2e are connected to the sheet feeding path 6. The large-capacity cassette mechanism 2d is structured as an optional unit which stores sheets having a size to be used in great quantities. The manual tray 2e is structured to be capable of feeding special sheets such as thick sheets, coating sheets, and film sheets which are difficult to be separately fed.

An electrostatic printing mechanism is illustrated as an example of the image forming portion 3. A photo conductor 9 (drum, belt), a light emitter 10 which emits an optical beam to the photo conductor 9, a developer 11, and a cleaner (not illustrated) are arranged around the photo conductor 9 which rotates. The drawing illustrates a monochrome printing mechanism. Here, a latent image is optically formed at the photo conductor 9 by the light emitter 10. The developer 11 causes toner ink to adhere to the latent image.

A sheet is fed from the sheet feeding path 6 to the image forming portion 3 in accordance with image-forming timing on the photo conductor 9. Then, the image is transferred onto the sheet at a transfer charger 12 and fixed by a fixing unit (roller) 13 which is arranged at an image forming apparatus sheet discharging path 14. An image forming apparatus sheet discharging roller 15 and an image forming apparatus sheet discharging port 16 are arranged at the image forming apparatus sheet discharging path 14 for conveying a sheet to a sheet processing apparatus B which is described later.

The scanner unit A2 is structured with a platen 17 on which an image document is placed, a carriage 18 which reciprocates along the platen 17, a light source which is mounted on the carriage 18, and a reducing optical system 20 (combination of a mirror and a lens) which guides reflection light from the document on the platen 17 to a photoelectric conversion device 19. A second platen (drive platen) 21 is illustrated in the drawing. The carriage 18 and the reducing optical system 20 read an image of the sheet fed from the feeder unit A3. The photoelectric conversion device 19 electrically transfers photoelectrically-converted image data to the image forming portion 3.

The feeder unit A3 is structured with a sheet feeding tray 22, a document feeding path 23 which guides a sheet fed from the sheet feed tray 22 to the drive platen 21, and a sheet discharge tray 24 which stores a document, an image of which is read at the drive platen 21.

Not limited to the abovementioned mechanism, the image forming apparatus A may adopt a printing mechanism such as an offset printing mechanism, an ink jet printing mechanism, and an ink ribbon transfer printing mechanism (thermal transfer ribbon printing, sublimation ribbon printing, or the like).

[Sheet Processing Apparatus]

As an apparatus to perform post-processing on sheets discharged from the image forming apparatus sheet discharging port 16 of the image forming apparatus A, the sheet processing apparatus B has following functions as;

(1) A function to stack and store image-formed sheets (first processing portion B1 and third processing portion B3; a printout mode), (2) A function to sort and store image-formed sheets (third processing portion B3; a jog sorting mode), (3) A function to collate and stack image-formed sheets and perform a binding process thereon (first processing portion B1; a binding processing mode), (4) A function to perform bookbinding with a folding process after image-formed sheets are collated and a binding process is performed thereon (second processing portion B2; a bookbinding processing mode), and (5) A function to form a punch hole at an image-formed sheet (a function of punching; a punch mode).

In the present invention, the sheet processing apparatus B is not necessarily required to have all the abovementioned functions. The sheet processing apparatus B may be appropriately arranged in accordance with apparatus specifications (design specifications).

Even in this case, it is required to include a binding processing portion (the first processing portion B1) which collates and stacks sheets and a first binding unit (a stapling unit which performs later-described staple binding) 47, and a second binding unit (a non-staple binding unit 51 which performs later-described non-staple binding) which are arranged at the binding processing portion. Further, it is required to have a stack structure to perform stacking after a binding process is performed with a selected binding device.

Figure 2:
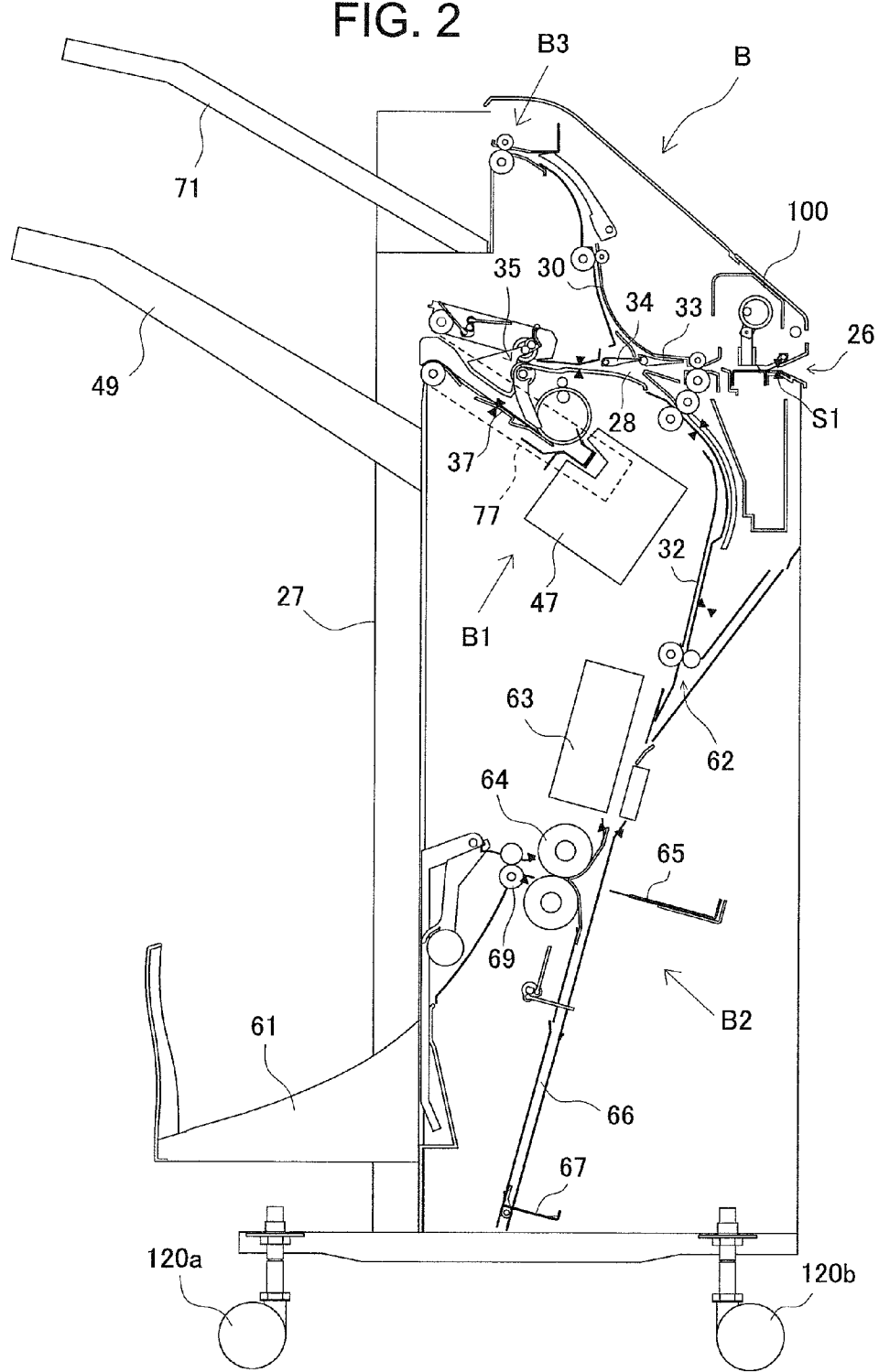
FIG. 2 is an explanatory view of a whole configuration of a sheet processing apparatus in the image forming system of FIG. 1.

FIG. 2 illustrates a detailed structure of the sheet processing apparatus B. The sheet processing apparatus B includes an introducing port 26 which is connected to the image forming apparatus sheet discharging port 16 of the image forming apparatus A and stores sheets introduced through the introducing port 26 at a storage portion (a first stack tray member 49, a second stack tray member 61, and a third stack tray member 71 which are described later) after a post-process is performed thereon.

In the post-processing apparatus B in the drawing, a sheet fed to a sheet conveying path 28 is conveyed to the first stack tray (hereinafter, called a first tray member) 49 from the first processing portion B1, to the second stack tray (hereinafter, called a second tray member) 61 from the second processing portion B2, or to the third stack tray (hereinafter, called a third tray member) 71 from the third processing portion B3.

The first processing portion B1 is arranged at a path exit (first sheet discharging port 35) of the sheet conveying path 28. Here, sequentially-fed sheets are stored at the first tray member (first storage portion, as the case may be) 49 after a binding process is performed thereon with the sheets being collated and stacked at a stack portion.

The second processing portion B2 is arranged at a path exit (second switchback path end described later) 62 branched from the sheet conveying path 28. Here, a folding process is performed on sequentially-fed sheets and the sheets are stored at the second tray member (second storage portion, as the case may be) 61 after a binding process is performed thereon with the sheets being collated and stacked.

The third processing portion B3 is assembled to the sheet conveying path 28. Here, conveyed sheets are stored at the third tray member (third storage portion, as the case may be) 71 after being offset by a predetermined amount in a direction intersecting with (in the present embodiment, a direction perpendicular to) a conveying direction (a direction in which sheets are conveyed to the sheet conveying path 28) and sorted. In the following, each structure will be described in detail.

[Processing Apparatus Housing]

As illustrated in FIG. 2, the sheet processing apparatus B includes a processing apparatus housing 27, the sheet conveying path 28 which is embedded in the processing apparatus housing 27 as having the introducing port 26 and the first sheet discharging port 35, the first to third processing portions B1, B2, B3 which perform a post-processing respectively on sheets fed from the sheet conveying path 28, and the first to third tray members 49, 61, 71 which store sheets fed from the respective processing portions.

The processing apparatus housing 27 in the drawing is arranged to have a height dimension from the installation face being approximately the same as the image forming apparatus housing 1 of the image forming apparatus A which is located at the upstream side. Then, the image forming apparatus sheet discharging port 16 of the image forming apparatus A and the introducing port 26 of the sheet processing apparatus B are connected.

The processing apparatus housing 27 illustrated in FIG. 2 is structured with an apparatus frame 70 and an external casing 73. The apparatus frame 70 forms a framework of a box-shaped apparatus as illustrated in the drawing. The apparatus frame 70 includes a front-side side frame 70f which is located at the front side in a state of FIG. 1, a rear-side side frame 70r which is located at the rear side, and stay members 70s (connection reinforcement members) which connect both the side frames 70. The sheet conveying path 28, a stack portion 37, the first tray member 49, and the like which are described later are attached between the right-left side frames 70.

The external casing 73 includes a side chassis (a front cover 73f which covers the front-side side frame 70f and a rear cover 73r which covers the rear-side side frame 70r).

Not limited to the illustrated shape, naturally, the processing apparatus housing 27 may have an appropriate shape in design. Further, not limited to the structure having right-left side frames and connection stays, the apparatus frame 70 may adopt a frame structure variously such as a monocoque structure.

[Sheet Conveying Path]

The sheet conveying path 28 is structured with a linear path which traverses the processing apparatus housing 27 approximately in the horizontal direction. The sheet conveying path 28 includes the introducing port 26 which is connected to the image forming apparatus sheet discharging port 16 of the image forming apparatus A, and the first sheet discharging port 35 which is arranged at the opposite side to the introducing port 26 as traversing the apparatus.

The sheet conveying path 28 is provided with a pair of conveying rollers (a sheet conveying device such as a roller and a belt, hereinafter, simply called a conveying roller) 29 which convey a sheet from the introducing port 26 toward the first sheet discharging port 35, a processing portion sheet discharging roller 36 (may be a belt as well) which is arranged at the first sheet discharging port 35, an inlet sensor S1 which detects a leading end and a tailing end of a sheet to be introduced to the path, and a sheet discharging sensor S2 which detects a leading end and a tailing end of a sheet at the path sheet discharging port.

The sheet conveying path 28 is connected to the first processing portion B1 and the second processing portion B2 so that sheets are sorted and conveyed thereto from the introducing port 26. The second processing portion B2 is connected to the upstream side in the path sheet discharging direction and the first processing portion B1 is connected to the downstream side therein.

The sheet conveying path 28 having an approximately linear shape is branched to convey a sheet from the introducing port 26 toward the second processing portion B2. Further, the sheet conveying path 28 is structured to guide a sheet from the introducing port 26 to the first processing portion B1 which is arranged at the downstream side of the first sheet discharging port 35.

Further, a third sheet conveying path 30 which guides a sheet on which a post-process is not performed at the first processing portion B1 or the second processing portion B2 to the third tray member 71 is connected to the sheet conveying path 28, so that a sheet is guided to the third tray member 71.

The third processing portion B3 is arranged at the sheet conveying path 28. The third processing portion B3 performs jog sorting to sort a sheet to be conveyed on the path by offsetting the sheet in a direction perpendicular to a sheet discharging direction. That is, the third processing portion B3 is arranged at the sheet conveying path 28 and sheets jog-sorted at the third processing portion B3 are stored at the third tray member 71.

As illustrated in FIG. 2, at the sheet conveying path 28, the third sheet conveying path 30, a second sheet conveying path 32, and a first sheet conveying path 31 are arranged as being branched in the order thereof from the introducing port 26 to the downstream side. A first path switching device 33 and a second path switching device 34 are arranged as illustrated in FIG. 2.

The second sheet conveying path 32 and the first sheet conveying path 31 are structured as a switchback path which guides a sheet to each processing portion as reversing the sheet conveying direction.

The third sheet conveying path 30 guides sheets fed from the introducing port 26 to the third tray member 71, the second sheet conveying path 32 guides sheets fed from the introducing port 26 to the second tray member 61, and the first sheet conveying path 31 guides sheets fed from the introducing port 26 to the first tray member 49.

The third processing portion B3 performs a jog sorting process on sheets at the path to be guided to the third tray member 71, the second processing portion B2 performs a bookbinding process on sheets to be guided to the second tray member 61, and the first processing portion B1 performs a binding process on sheets to be guided to the first tray member 49.

The first path switching device 33 is structured with a flapper guide which changes a sheet conveying direction and is connected to a driving device such as an electromagnetic solenoid and a miniature motor (not illustrated). At the first path switching device 33, a sheet fed from the introducing port 26 is selected to be guided to the third sheet conveying path 30 or to the first and second sheet conveying paths 31, 32.

At the second path switching device 34, a sheet fed from the introducing port 26 is selected to be guided to the second processing portion B2 or the first processing portion B1 at the downstream side thereof. A driving device (not illustrated) is connected to the second path switching device 34 as well. Further, a punching unit 100 which forms a punch hole at an introduced sheet is arranged at the sheet conveying path 28.

[First Processing Portion]

The first processing portion B1 arranged at the downstream side of the sheet conveying path 28 is structured with the stack portion 37 which collates and stacks sheets fed from the first sheet discharging port 35 and a binding processing mechanism which performs a binding process on a stacked sheet bundle.

As illustrated in FIG. 2, a step is formed at the first sheet discharging port 35 of the sheet conveying path 28 and the stack portion 37 is arranged therebelow. The first sheet conveying path (first switchback path) 31 which guides a sheet from the first sheet discharging port 35 as reversing a conveying direction is formed between the first sheet discharging port 35 and the stack portion 37.

A sheet introducing mechanism which introduces a sheet from the first sheet discharging port 35 onto the stack portion 37 is arranged between the first sheet discharging port 35 and the stack portion 37. A positioning mechanism which positions sheets at a predetermined binding position and a sheet bundle discharging mechanism which discharges a bound sheet bundle to the first tray member 49 at the downstream side are arranged at the stack portion 37. Each configuration is described later.

Here, the stack portion 37 illustrated in FIG. 2 bridge-supports a sheet fed from the first sheet discharging port 35 between the stack portion 37 and the first tray member 49 at the downstream side. That is, a sheet fed from the first sheet discharging port 35 is to be bridge-supported with the leading end thereof being on the upmost sheet on the first tray member 49 at the downstream side and the tailing end thereof being on the stack portion 37.

[Second Processing Portion]

A second sheet conveying path (second switchback path) 32 is branched from and connected to the upstream side of the first sheet conveying path (first switchback path) 31 at the sheet conveying path 28 to guide a sheet to the second processing portion B2.

At the second processing portion B2, sheets fed from the sheet conveying path 28 are collated and stacked, and then, an inward-fold processing (hereinafter, called a magazine finishing) is performed on the sheets as performing a binding process on the center part thereof. The second tray member 61 is arranged at the downstream side of the second processing portion B2 to store a bookbinding-processed sheet bundle.

The second processing portion B2 includes a second processing guide member 66 which stacks sheets into a bundle shape, a leading end regulating stopper 67 which performs positioning of sheets at a predetermined position on the second processing guide member 66, a center-binding stapling unit 63 which performs a binding process at the center part of the sheets which are positioned by the leading end regulating stopper 67, and a fold-processing mechanism (a pair of folding rollers 64 and a folding blade 65) which folds a sheet bundle at the center part after the binding process is performed.

As disclosed in Japanese Patent Application Laid-open No. 2008-184324, Japanese Patent Application Laid-open No. 2009-051644, and the like, the center-binding stapling unit 63 adopts a mechanism which performs a binding process while a sheet bundle is moved along the sheet center part (line) with the sheet bundle nipped by a head unit and an anvil unit.

Further, as illustrated in FIG. 2, the fold-processing mechanism has a structure to perform folding with rolling of the pair of folding rollers 64 after a folding line part of a sheet bundle is inserted by the folding blade 65 between the pair of folding rollers 64 which are mutually press-contacted. Such a mechanism is also disclosed in Japanese Patent Application Laid-open No. 2008-184324, Japanese Patent Application Laid-open No. 2009-051644, and the like.

In the drawing, the first processing portion B1 and the sheet conveying path 28 are arranged approximately in the horizontal direction, the second sheet conveying path 32 which guides sheets to the second processing portion B2 is arranged in the vertical direction, and the second processing guide member 66 which collates and stacks sheets is arranged approximately in the vertical direction.

As described above, the sheet conveying path 28 is arranged in a direction of traversing the processing apparatus housing 27 and the processing conveying path (second sheet conveying path 32) B2 is arranged in the vertical direction, so that the apparatus can be slimmed.

The second tray member 61 is arranged at the downstream side of the second processing portion B2 to store a sheet bundle which is folded into a magazine shape. In the drawing, the second tray member 61 is arranged below the first tray member 49. In view of that a frequency in use of the first tray member 49 is higher than a frequency in use of the second tray member 61, the first tray member 49 is arranged at a height position at which sheets are easily taken out from the first tray member 49.

[Third Processing Portion]

The third sheet conveying path 30 is arranged at the sheet conveying path 28 at the upstream side of the first sheet conveying path 31 and the second sheet conveying path 32, so that a sheet is guided from the introducing port 26 to the third tray member 71. Further, a roller shifting mechanism (not illustrated) which offsets a fed sheet by a predetermined amount in a perpendicular direction is arranged at the path (the sheet conveying path 28 or the third sheet conveying path 30) for guiding the sheet from the introducing port 26 to the third tray member 71.

Then, sheets are stored onto the third tray member 71 while the sheets to be discharged from the introducing port 26 to the third tray member 71 are shifted (offset) in the perpendicular direction so that the sheets are sorted for each bundle. Since a variety of mechanisms are known as such a jog sorting mechanism, description thereof is skipped.

[Structure of Manual Setting Portion]

A sheet processing mechanism portion which stores sheets at the first tray member 49 after guiding the sheets from the sheet conveying path 28 to the stack portion 37 and performing a post-process on the sheets, and a manual setting portion (hereinafter, called a setting portion) 77 for performing a binding process while an externally-prepared sheet bundle is inserted to the external casing 73 are arranged at the processing apparatus housing 27.

When a binding processing mechanism is arranged at the exterior of the sheet processing apparatus B, the setting portion 77 is convenient for an operator to collate, for example, image-read document sheets and performing a binding process thereon. Accordingly, a sheet bundle collated by an operator is arranged at a part of a casing and a mechanism which performs a binding process with a built-in stapling unit or another binding processing unit is arranged therein.

The setting portion 77 arranged for the abovementioned purpose includes a slit-shaped opening 77a, a setting face 77b, and a position regulating face 77c. Further, the binding processing mechanism which performs a binding process on a sheet bundle set on the setting face is arranged in the external casing 73.

Figure 4:
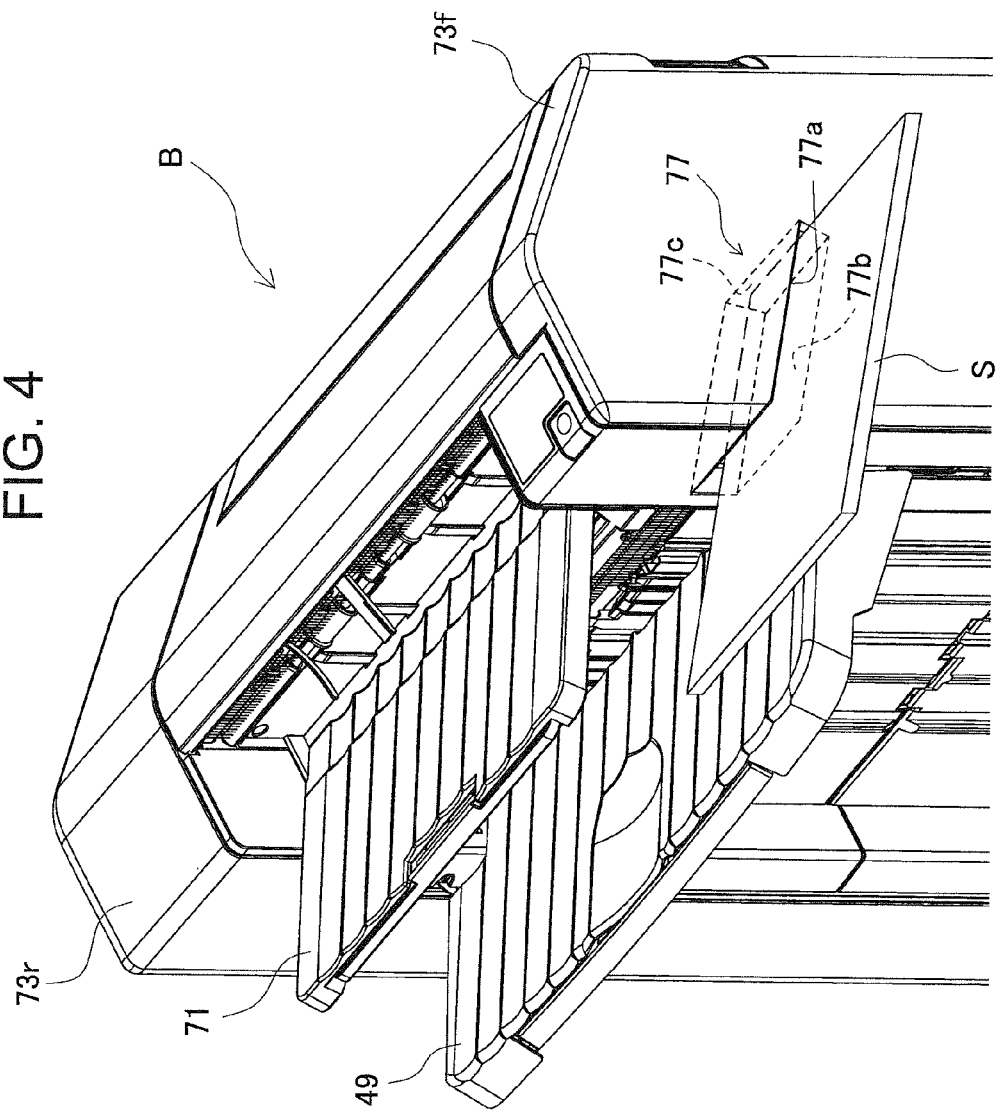
FIG. 4 is a perspective view of a manual setting portion in the sheet processing apparatus.

As illustrated in FIG. 4, the slit-shaped opening 77a is arranged at the side chassis (front cover 73f) located at the apparatus front side, and the setting face 77b and the position regulating face 77c are arranged at the side frame 70f, so that a sheet bundle S is inserted thereto from the outside. In the illustrated apparatus, the slit-shaped opening 77a is arranged at a position to support a sheet bundle on the same plane as the stack portion 37 described with reference to FIG. 2 as being mutually adjacent thereto.

According to the above arrangement, a binding process is performed on a manually-set sheet bundle while the later-described binding processing mechanism (stapling unit (first binding unit 47)) capable of being moved along an end edge of the stack portion 37 is moved to the setting face 77b which is arranged at a position adjacent to the stack portion 37. Thus, the setting face 77b is arranged to form the same plane with the sheet placement face 37a of the stack portion 37.

The slit-shaped opening 77a is arranged at the front cover 73f so that a sheet bundle can be inserted onto the setting face 77b (on the same plane as the stack portion 37). The whole or a part of the front cover 73f at which the slit-shaped opening 77a is formed is hinge-connected to the apparatus frame 70 as being capable of being opened and closed.

A sheet bundle S which is manually inserted through the slit-shaped opening 77a is inserted to a binding position along the setting face 77b and is regulated with an end face thereof being abutted to the position regulating face 77c at the binding position. Thus, the sheet bundle S which is inserted from the outside has the lower face thereof supported by the setting face 77b and the end face thereof abutted to and regulated by the position regulating face 77c so as to be positioned at the predetermined binding position.

The stapling unit (first binding unit) 47 is arranged at the inner side of the setting face 77b and the position regulating face 77c. In the illustrated apparatus, the binding unit 47 is supported by a guide rail to be movable between the binding position (second position) at the stack portion 37 and the binding position (first position) at the setting face 77b and is moved by a drive mechanism which includes a shifting motor.

[Binding Process Operation at Manual Setting Portion]

Description is provided on a binding process operation. In an operation mode in which a binding process (e.g., post-processing at the second processing portion B2 or the third processing portion B3) is not performed at the stack portion 37, a later-described post-processing controller 95 causes the first binding unit 47 to wait at the (manual) binding position (first position) at the setting face 77b or the vicinity thereof. In the illustrated apparatus, a home position of the first binding unit 47 is set at the manual binding position Mp being at the front side of the side frame 70f.

[Punching Unit]

Description is provided on the punching unit 100 which is arranged at the sheet conveying path 28 for performing a predetermined process (forming a punch hole) on a sheet fed from the introducing port 26. The punching unit 100 forms the specified number of holes with a plurality of punching members 101a to 101e arranged at predetermined intervals in a direction perpendicular to the sheet conveying direction of the sheet conveying path 28.

Figure 5:
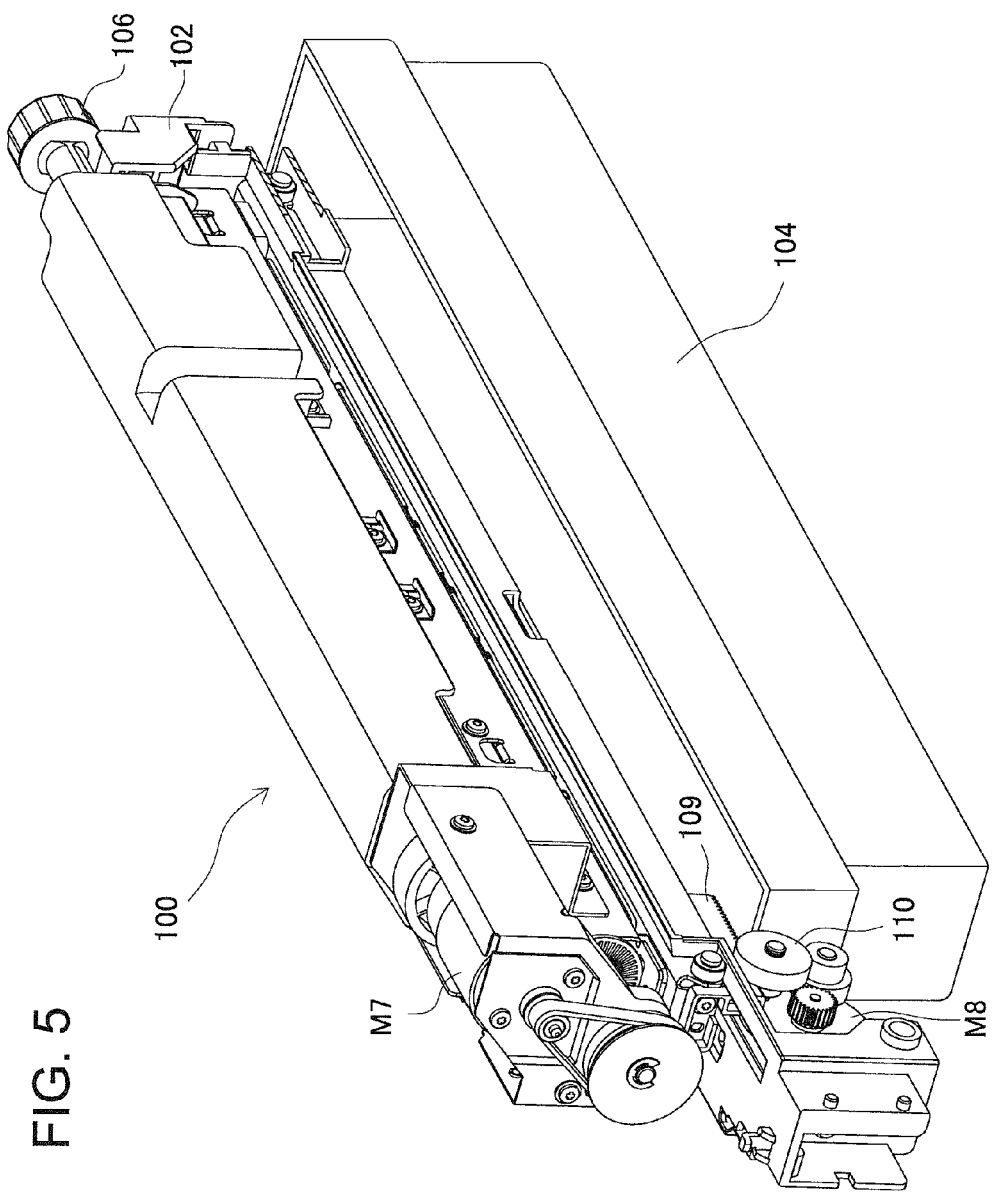
FIG. 5 is a whole perspective view of a punching unit in the apparatus of FIG. 2.

FIG. 5 illustrates a whole structure of the punching unit 100. The punching unit 100 is structured with a unit frame 102, the plurality of punching members 101a to 101e which are arranged at the unit frame 102 to be vertically movable, a plurality of rotary cam devices 103a to 103e which vertically move (reciprocate in the punching direction) the respective punching members, and a drive motor M7 which drives the plurality of rotary cam devices 103a to 103e.

A waste box 104 is arranged below the plurality of punching members 101a to 101e for storing punch waste sheet pieces. The waste box 104 is attached to the apparatus frame 70 (being different from the unit frame 102) slidably on a waste box guide rail 105.

A punch jam releasing device 106 is a rotary operating member. When jamming occurs at the plurality of punching members 101a to 101e or when an error occurs at the drive motor M7, the plurality of punching members 101a to 101e biting a sheet is separated (detached) therefrom by forcedly rotating the plurality of rotary cam devices 103a to 103e. Accordingly, the punch jam releasing device 106 is structured with a manual rotating knob which is connected to a punch driving rotary shaft 107 for the plurality of rotary cam devices 103a to 103e.

Figure 6:
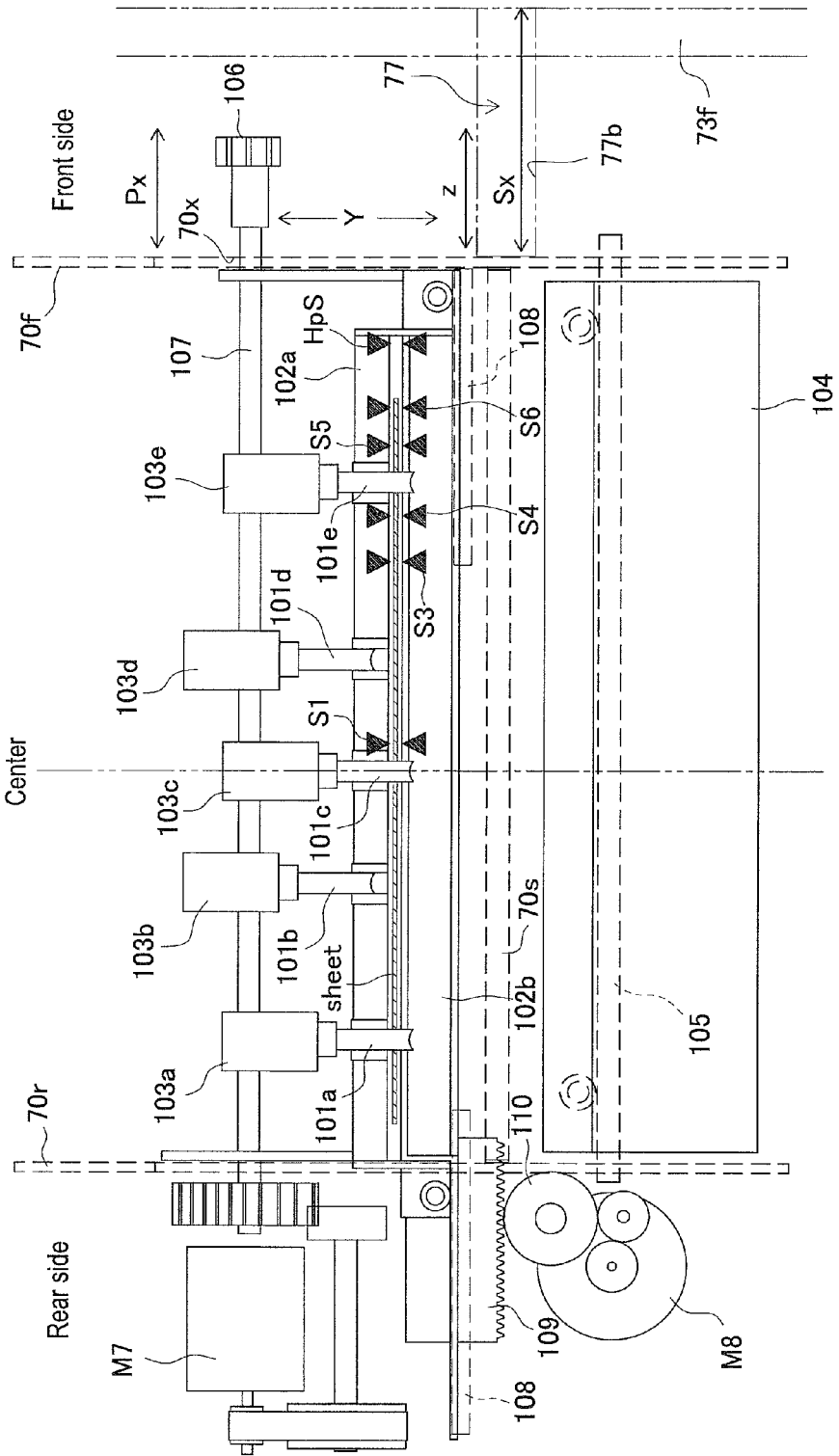
FIG. 6 is an explanatory view of a shifting mechanism of the punching unit.

As illustrated in FIG. 6, the unit frame 102 includes a punch upper frame 102a and a punch lower frame 102b respectively having a predetermined length in a direction perpendicular to the sheet conveying direction of the sheet conveying path 28. The plurality of punching members 101a to 101e are arranged at the punch upper frame 102a at the predetermined intervals in the direction perpendicular to the sheet conveying direction (hereinafter, called a conveyance perpendicular direction) as being capable of reciprocating in the punching direction (movable upward and downward).

Punching holes (dies) are formed at the punch lower frame 102b at positions being opposed respectively to the plurality of punching members 101a to 101e. Further, the punch driving rotary shaft 107 is arranged at the unit frame 102. The plurality of rotary cam devices 103a to 103e which vertically move the plurality of punching members 101a to 101e are attached to the punch driving rotary shaft 107. The drive motor M7 is connected to the punch driving rotary shaft 107 via a transmission mechanism.

The plurality of rotary cam devices 103a to 103e in FIG. 6 are formed of cylindrical cam members corresponding to the plurality of punching members 101a to 101e as being axially-fixed to the punch driving rotary shaft 107. Each of the punching members 101a to 101e is connected to each of the cylindrical cam members with a connection pin. The plurality of punching members 101a to 101e are vertically moved in the punching direction with rotation of the punch driving rotary shaft 107 in a predetermined angle range.

Here, the punching members 101b, 101d being in a first group (e.g., for forming two holes) are vertically moved in the punching direction in a first rotational angle range of the punch driving rotary shaft 107 and the punching members 101a, 101c, 101e being in a second group (e.g., for forming three holes) are vertically moved in the punching direction in a second rotational angle range being different from the first rotational angle range.

Accordingly, the later-described post-processing controller 95 can cause the punching members 101b, 101d in the first group to perform punching action with two-way rotation of the punch driving rotary shaft 107 in a predetermined angle range and cause the punching members 101a, 101c, 101e in the second group to perform punching action with two-way rotation of the punch driving rotary shaft 107 in a different angle range therefrom.

The waste box 104 is arranged below the plurality of punching members 101a to 101e. The waste box 104 is supported by the waste box guide rail 105 arranged at the apparatus frame 70 as being detachably attachable from the apparatus front side (in the drawing, from the front cover 73f side).

That is, the abovementioned front cover 73f is hinge-connected to the apparatus frame 70 as being capable of being opened and closed. The waste box 104 is to be detached to the outside of the apparatus in a state that the front cover 73f is opened.

As described above, the drive motor M7 is connected to the punch driving rotary shaft 107 via a speed-reducing mechanism (gear transmission mechanism). Further, a rotary member (punch jam releasing device 106) is arranged at the punch driving rotary shaft 107 at the front side of the side frame 70f as passing through a hole formed at the side frame 70f so as to be manually rotated by an operator.

Further, the front cover 73f is arranged at the apparatus front side of the apparatus frame 70 in an openable and closable manner, so that the punch jam releasing device 106 arranged at the inner side of the front cover 73f can be operated in an opened state. In the opened state, drive power is not supplied (i.e., interrupted) to the drive motor M7.

[Shifting Mechanism of Punching Unit]

The punching unit 100 is movably attached to the apparatus frame 70. For example, the punching unit 100 is attached to the stay member 70s which connects the side frame 70f and the side frame 70r of the apparatus frame 70 and is slidably fitted on a punch guide member 108 with the unit frame 102 passing through an opening 70x formed at the side frame 70f.

Further, a punch rack 109 is integrally formed with apart of the punch lower frame 102b. The whole unit frame 102 is moved by a shift motor M8 and a punch shift driving pinion 110 arranged at the apparatus frame 70 side.

The punching unit 100 is configured to be movable in the conveyance perpendicular direction in consideration of the following. A sheet introduced to the sheet conveying path 28 becomes in a state of being posininally shifted in the conveyance perpendicular direction because of (1) dimensional errors of sheet size, (2) sheet positional shifting at the image forming portion, and the like.

If punch holes are formed without correcting the abovementioned positional shifting amount, finishing quality is drastically deteriorated. For correcting positional shifting of an introduced sheet, it is required to move the punching unit 100 in the conveyance perpendicular direction or to move a sheet in the conveyance perpendicular direction.

According to the present invention, the punching unit 100 is moved in the conveyance perpendicular direction in accordance with a sheet fed to the sheet conveying path 28, the movement direction thereof is set to the same direction as the abovementioned setting portion 77 (to the apparatus front side), and a movement area Px of the punching unit 100 and a sheet setting area Sx of the setting portion are arranged to be mutually overlapped in the conveyance perpendicular direction.

[Shift Control of Punching Unit]

The punching unit 100 is moved to a punch hole position suited with reference to a side edge of a sheet introduced to the sheet conveyance path 28. As described above, this is for preventing positional shifting of a punch hole position of each sheet due to dimensional errors of the sheet and positional shifting of the sheet introduced to the introducing port.

Any of the following may be adopted as a method for the above;

(1) a sensor array to detect a sheet side edge is arranged at the sheet conveying path 28 and the punching unit 100 is moved by a movement amount which is determined from size information of a sheet fed from the image forming apparatus A and an array signal of detecting a sheet side edge, (2) a sensor to detect a sheet side edge is arranged at the punching unit 100 and a sheet side edge is detected by the sensor while the punching unit 100 is moved in the conveyance perpendicular direction at the timing when the sheet enters the introducing path. Then, the punching unit 100 is moved by a movement amount which is determined from the detection signal and sheet size information, and (3) a plurality of sensors corresponding to sheet size are arranged at the punching unit 100 and a sheet side edge is detected while the punching unit 100 is moved in the conveyance perpendicular direction at the timing when the sheet enters. Then, sheet size is determined from the detected sensor signals and the punching unit 100 is moved in the conveyance perpendicular direction.

In the illustrated apparatus, the method of (3) is adopted. Accordingly, the movement amount of the punching unit 100 can be set to the minimum and the apparatus can be downsized.

Here, for detecting a sheet side edge, sensors S3 (e.g., for JIS vertical B5), S4 (for vertical A4), S5 (for horizontal B5), and S6 (for horizontal A4 and vertical A3) are arranged at the unit frame 102 for sizes, respectively. A sensor S1 illustrated in FIG. 2 is an inlet sensor which is arranged at the sheet conveying path 28 and a sensor S2 is an outlet sensor (sheet discharge sensor). Further, a home position sensor HpS is attached to the unit frame 102.

The later-described post-processing controller 95 causes the punching unit 100 to move from a home position in a predetermined direction based on a detection signal from the inlet sensor S1 which detects timing when a sheet leading end enters the sheet conveying path 28.

Then, a punch position is determined in accordance with sheet size after receiving a detection signal of the sensor which detects a sheet side edge, acknowledging which sensor has transmitted the signal, and determining the sheet size and the sheet side edge. Then, the punching unit 100 is moved to the punch position. Here, the shifting motor M8 has a rotary shaft connected to an encoder which detects a rotational amount or is structured with a stepping motor.

Figure 7:
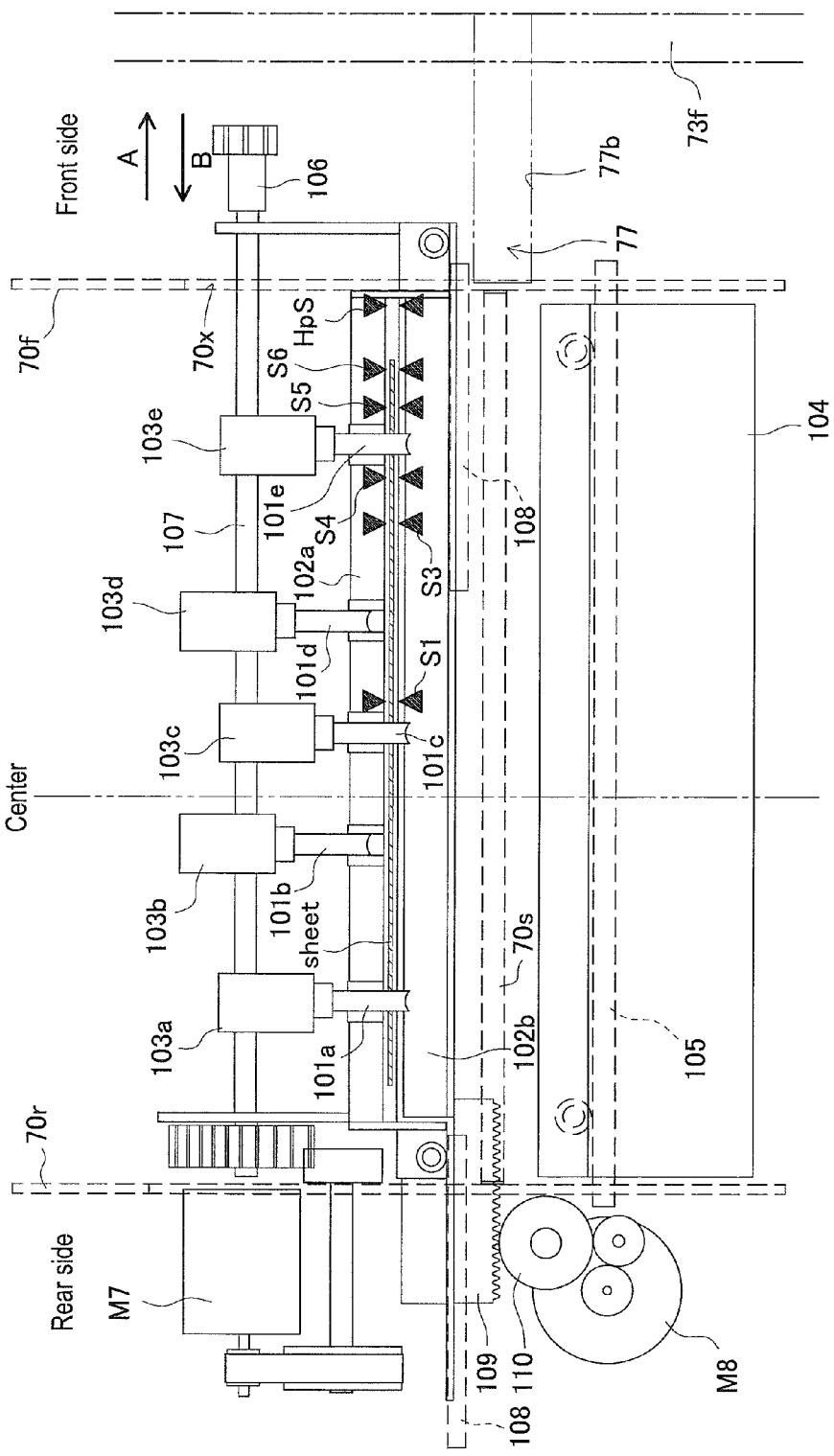
FIG. 7 is a view illustrating a state that the punching unit is moved to an apparatus front side from the state of FIG. 6.

The post-processing controller 95 causes the punching unit 100 to be moved outward of a sheet (in a direction of arrow A in FIG. 7) with reference to a signal of the sheet leading end detected by the inlet sensor S1 and detects a side edge of the sheet. Subsequently, the post-processing controller 95 causes the punching unit 100 to be stopped after overrunning by a predetermined amount and is moved to the sheet center side (in a direction of arrow B).

Then, the side edge of the sheet is detected again and the punching unit 100 is moved to the sheet center side by a predetermined amount with reference to the detection signal to be positioned at a punching position. Thus, the punching unit 100 is moved to the sheet center side after being moved to a position outside the sheet (in a direction from a small-size sheet to a large-size sheet) and the sheet side edge is detected. According to the above, it is possible to eliminate positional errors due to backlash in the drive mechanism.

In the present invention, a movement area (Px in FIG. 6) of the punching unit 100 in the conveyance perpendicular direction and a sheet setting area (Sx in FIG. 6) of the setting face 77b of the setting portion 77 are arranged at different positions which are distanced in the sheet conveying direction of the sheet conveying path 28. In addition, the movement area Px of the punching unit 100 and the sheet setting area Sx of the setting face 77b are arranged at different positions as forming a step Y.

That is, the area Px and the area Sx are arranged at positions different in the sheet conveying direction as well as positions (as forming the step Y) different in the height direction perpendicular to the sheet conveying direction. Further, the area Px and the area Sx are arranged at positions mutually overlapping in the sheet width direction (as having an overlap amount z). According to the above, the apparatus can be downsized by the overlap amount.

[Conveying Roller Shifting Mechanism at Sheet Conveying Path]

The conveying roller 29 which guides a sheet introduced through the introducing port 26 to the first sheet conveying path 31, the second sheet conveying path 32, and the third sheet conveying path 30 is arranged at the sheet conveying path 28. Further, a sheet discharging roller is arranged at the sheet discharging port of each of the first to third conveying paths. The roller in each path is structured with a pair of rollers which nip and convey a sheet as being connected to a drive motor (not illustrated) to be rotated at the same circumferential speed.

The conveying roller 29 located close to the introducing port 26 is structured with a pair of rollers which are arranged between the punching unit 100 and the first path switching device 33. The conveying roller 29 is structured with a driving roller 111 and a driven roller 112 which are axially-supported by the right-left side frames 70f, 70r in a rotatable manner.

A driving rotary shaft 115 is connected to a driving roller shaft 113 with a transmission mechanism 116 (in the drawing, gear transmission). A drive motor (not illustrated) which is commonly used for the processing portion sheet discharging roller 36 is connected to the driving rotary shaft 115. A driven roller shaft 114 is axially-supported by the right-left side frames 70f, 70r as being freely movable.

Figure 8:
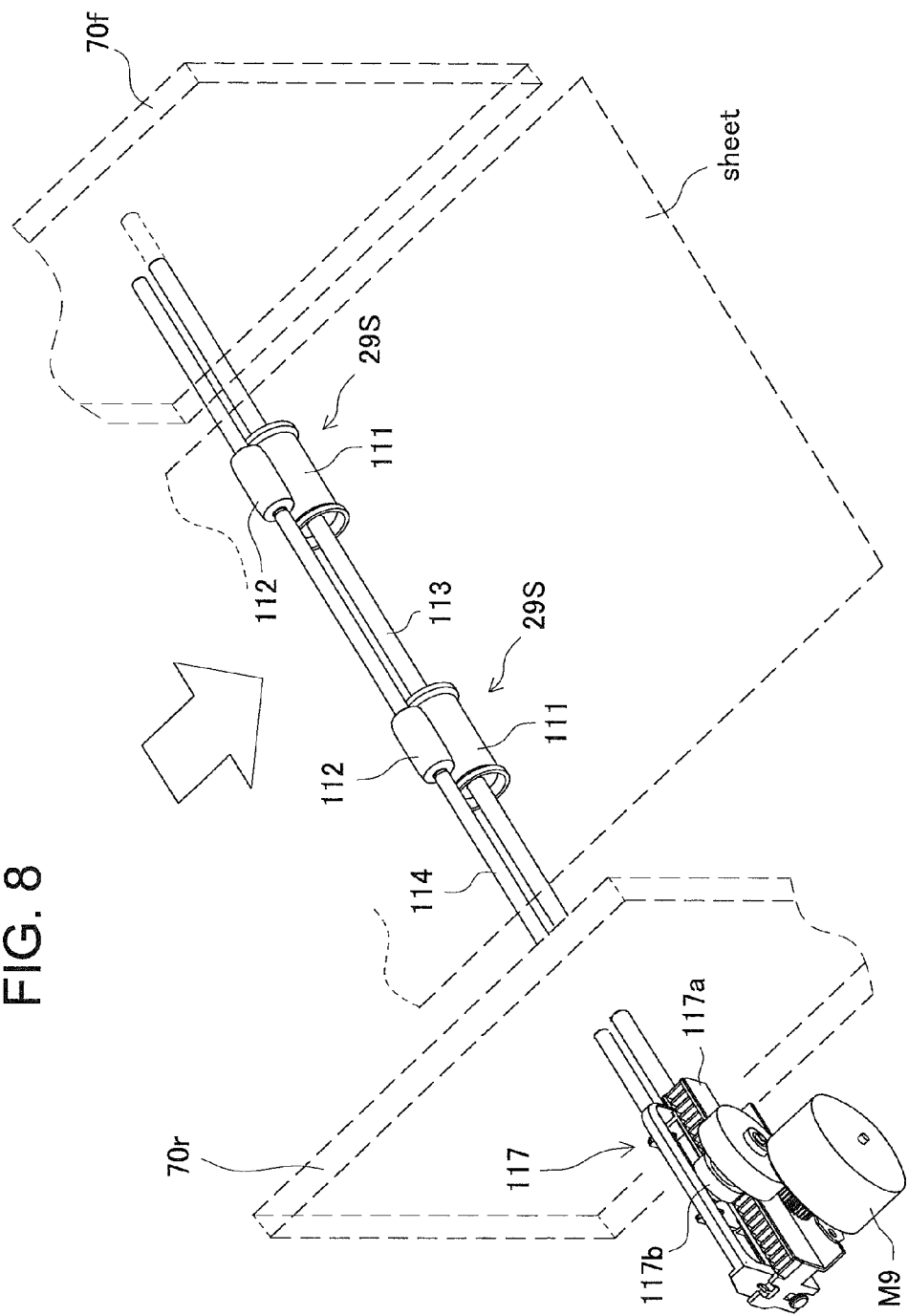
FIG. 8 is a perspective view illustrating a structure of a roller shifting mechanism in the apparatus of FIG. 2.
Figure 10:
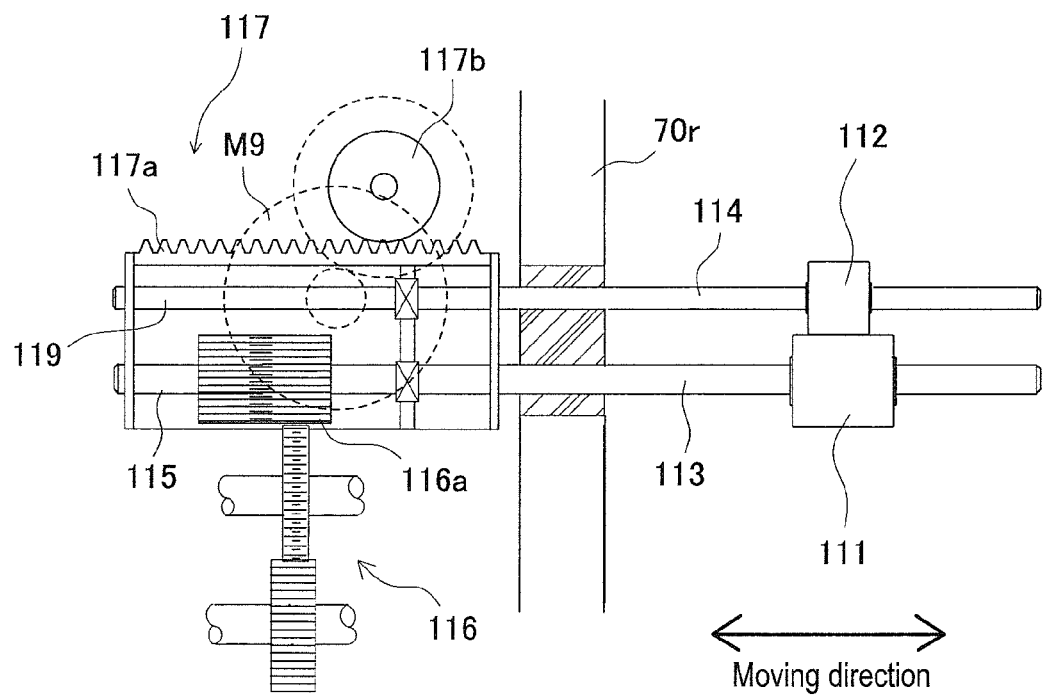
FIG. 10 is a structural explanatory view of a shifting member in the apparatus of FIG. 2.

As illustrated in FIG. 8, conveying rollers 29s arranged at the second sheet discharging port are rotatably attached to a shifting member 117 which connects the driving roller shaft 113 and the driven roller shaft 114. As illustrated in FIG. 10, the driving roller shaft 113 and the driven roller shaft 114 are connected by the shifting member 117 to be integrally moved in the axial direction (thrust direction). Here, the driving roller shaft 113 and the driven roller shaft 114 are independently rotated in the circumferential direction.

The driving roller shaft 113 is axially-supported by the right-left side frames 70f, 70r. An end of the driving roller shaft 113 is located in a range indicated as an axial movement area Rs of the conveying roller 29s at the front side of the side frame 70f. The other end thereof is located at the rear side of the side frame 70r. The shifting member 117 (e.g., block member made of synthetic resin) integrally connects the driving roller shaft 113 and the driven roller shaft 114 as being supported thereby.

A shift rack 117a is integrally formed with the shifting member 117 and engaged with a shift motor M9 which is attached to the side frame 70r (apparatus frame, as the case may be) and a roller shift transmission pinion 117b. According to such a structure, the shifting member 117 can be moved in an axial direction of the conveying roller 29 with rotation of the shift motor M9 (in the drawing, stepping motor capable of rotating positively and reversely).

A passive gear 116a is integrally arranged with the driving rotary shaft 115. Rotation of the drive motor is transmitted to the passive gear 116a. The pair of conveying rollers 29s (the driving roller and the driven roller) are pressure-contacted so that a driven rotary shaft 119 is driven to be rotated with rotation of the driving rotary shaft 115.

In the present invention, the driving rotary shaft 115 and the driven rotary shaft 119 are mutually connected so that one thereof follows axial movement of the other as in the illustrated embodiment. Alternatively, it is also possible that one of the driving roller 111 and the driven roller 112 is attached to the rotary shaft slidably in the axial direction while the other is moved in the axial direction as being interlocked to the movement.

For guiding a sheet to the third processing portion B3, the later-described post-processing controller 95 causes the conveying roller 29s arranged at the second sheet discharging port to nip a sheet introduced through the introducing port 26 and to temporarily stop or move in the axial direction by a predetermined amount as remaining in the conveyed state (jog shift operation) at the time when the sheet passes through the conveying roller 29 which is located at the upstream side. The movement amount is set during apparatus designing in several ten millimeters as being controlled by the post-processing controller 95 with a rotational amount of the shift motor M9.

According to such a structure and control, a sheet introduced to the introducing port 26 is shifted to a different position in the conveyance perpendicular direction for each bundle by the conveying roller 29s arranged at the second sheet discharging port and discharged to the third tray member 71. Thus, sheets are stored at the third tray member 71 in a state that a predetermined process (jog sorting for each bundle) is performed thereon.

The conveying roller 29s is arranged to be movable in the axial direction (sheet width direction, as the case may be) as well as to be rotatable for conveying a nipped sheet in the conveying direction.

Figure 9:
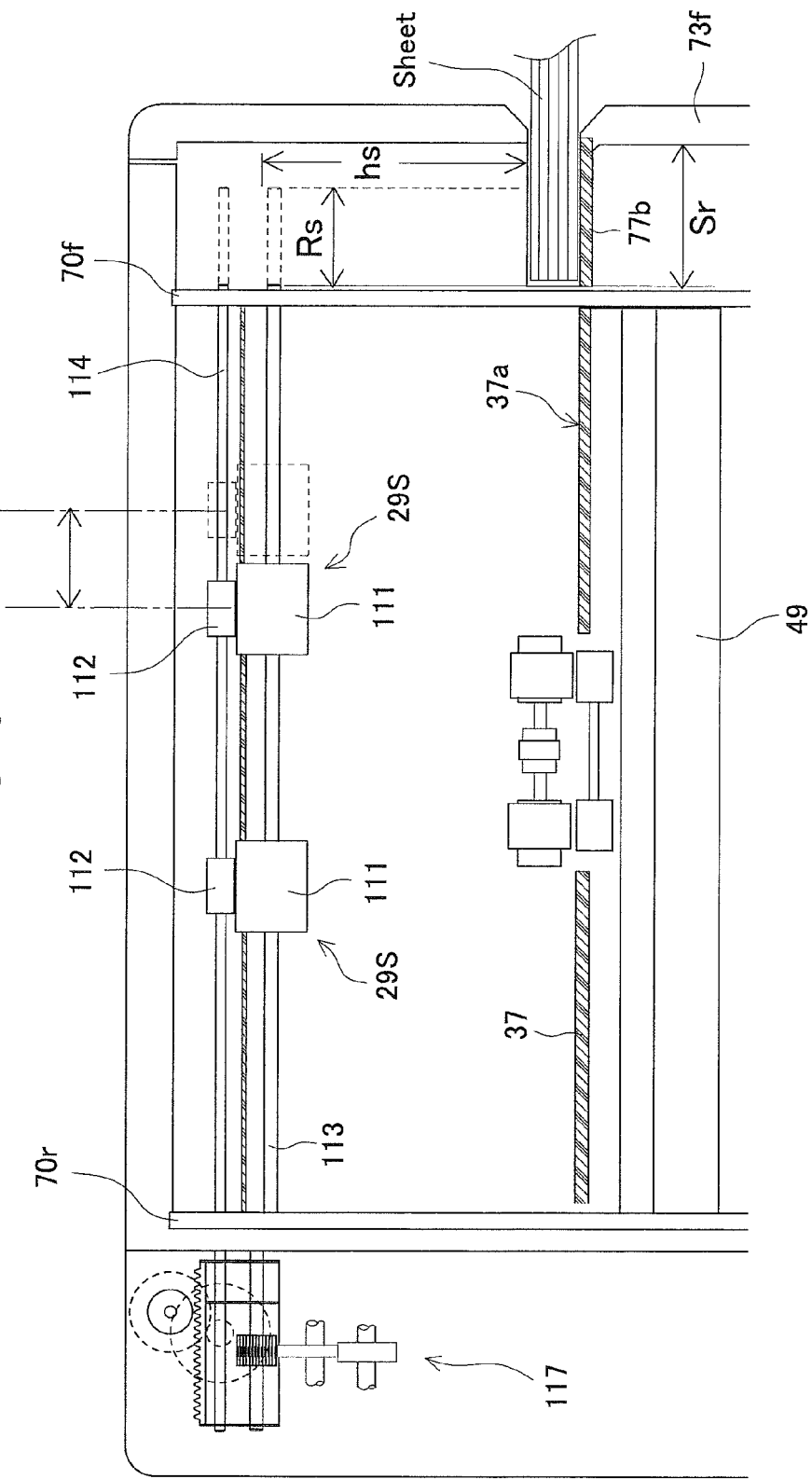
FIG. 9 is a view illustrating an arrangement relation between the roller shifting mechanism and the setting portion.

Further, the conveying roller 29s is connected to the shift motor M9 for moving in the conveyance perpendicular direction and the drive motor for transmitting rotation in the conveying direction. Next, description is provided on a relation between the conveying roller 29s arranged at the second sheet discharging port and the abovementioned setting portion 77 with reference to FIG. 9.

A step hs (height difference hs>0) is formed between the conveying roller 29s and the setting face 77b. In the illustrated embodiment, the setting face 77b is arranged on the same plane as the sheet placement face 37a of the stack portion 37 as being adjacent thereto. The sheet placement face 37a is arranged below the sheet conveying path 28 as forming a step therefrom.

Accordingly, the conveying roller 29s and the setting face 77b are arranged respectively on different planes having a height difference of the step hs. Further, the axial movement area Rs (jog displacement area) of the conveying roller 29s and a sheet support area Sr of the setting face 77b are arranged to be mutually overlapped at the apparatus front side in a superimposed manner.

[Structure of First Processing Portion]

Description is provided on the respective structures of a sheet introducing mechanism, a sheet positioning mechanism, a binding processing mechanism, and the sheet bundle discharging mechanism of the first processing portion B1.

[Sheet Introducing Mechanism]

Figure 3:
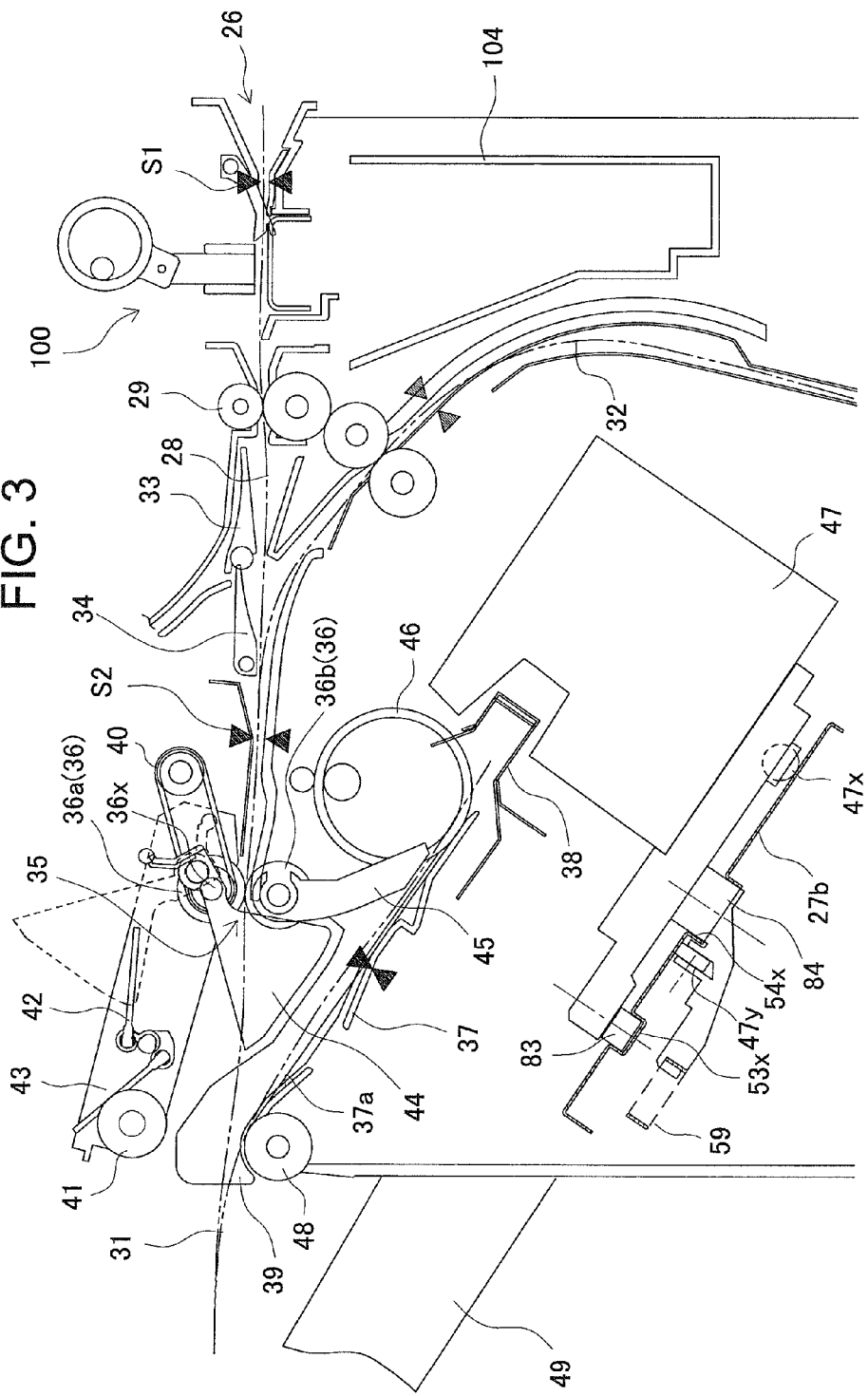
FIG. 3 is an enlarged view of a main part of a path in the apparatus of FIG. 2.

As illustrated in FIG. 3, a reverse conveying mechanism 41, 42 which performs switchback conveying on a sheet from the first sheet discharging port 35 in an opposite direction to the sheet discharging direction, a guiding mechanism (sheet guiding member 44) which guides a sheet to the tray side, and a raking rotor 46 which guides a sheet to a leading end regulating device are arranged between the first sheet discharging port 35 and the stack portion 37.

The reverse conveying mechanism includes a lifting-lowering roller 41 which is moved upward and downward between an operating position to be engaged with a sheet to be introduced onto the stack portion 37 and a waiting position to be separated therefrom, and a paddle rotor 42 which conveys a sheet in the direction opposite to the sheet discharging direction. The lifting-lowering roller 41 and the paddle rotor 42 are attached to a swing bracket 43.

The swing bracket 43 is arranged at the first binding unit frame 27a swingably about a processing rotating shaft 36x (in the drawing, a sheet discharging roller shaft). A rotating shaft of the lifting-lowering roller 41 and a rotating shaft of the paddle rotor 42 are bearing-supported by the swing bracket 43.

A lifting-lowering motor (not illustrated) is connected to the swing bracket 43, so that the lifting-lowering roller 41 and the paddle rotor 42 which are mounted thereon are moved upward and downward between the operating position to be engaged with a sheet and the waiting position to be separated therefrom.

Further, a drive motor (not illustrated) is connected to each of the lifting-lowering roller 41 and the paddle rotor 42 to transmit driving so that the lifting-lowering roller 41 is rotated in forward and reverse directions and the paddle rotor 42 is rotated in a reverse direction (a direction opposite to the sheet discharging direction). Further, a discharging roller device 48 which is mutually pressure-contacted to the lifting-lowering roller 41 is arranged at the stack portion 37, so that a sheet or bundle-shaped sheets is nipped and conveyed to the downstream side.

The guiding mechanism which guides a tailing end of a sheet introduced onto the stack portion 37 toward a sheet end regulating member 38 is arranged between the lifting-lowering roller 41 and the later-described raking rotor 46. As illustrated in FIG. 3, the guiding mechanism is structured with the sheet guiding member 44 which is moved upward and downward between a state illustrated in a dotted line and a state illustrated in a solid line. The sheet guiding member 44 retracts to the dotted-line position when a sheet is discharged from the first sheet discharging port 35. After a tailing end of the sheet passes through the first sheet discharging port 35, the sheet guiding member 44 guides the sheet tailing end onto the stack portion 37.

A driving mechanism (not illustrated) is connected to the sheet guiding member 44, so that the sheet guiding member 44 is moved upward and downward in accordance with timing of guiding the sheet tailing end from the first sheet discharging port 35 onto the stack portion 37.

[Sheet Positioning Mechanism]

The positioning mechanism (the sheet end regulating member 38 and a side edge aligning member 39) which positions sheets at a predetermined binding position is arranged at the stack portion 37. As illustrated in the drawing, the positioning mechanism is structured with the sheet end regulating member 38 which performs regulation with abutting against a sheet tailing end and the side edge aligning member 39 which positions a sheet side edge at a reference position (center reference, side reference).

As illustrated in FIG. 3, the sheet end regulating member 38 is structured with a stopper member which performs regulation with abutting against a sheet tailing end. The side edge aligning member 39 is described later with reference to FIG. 12. In the illustrated apparatus, a sheet is discharged from the sheet conveying path 28 in center reference. Then, in accordance with a binding mode, the sheet is positioned in center reference as well or side reference.

[Side Edge Aligning Member]

Figure 12:
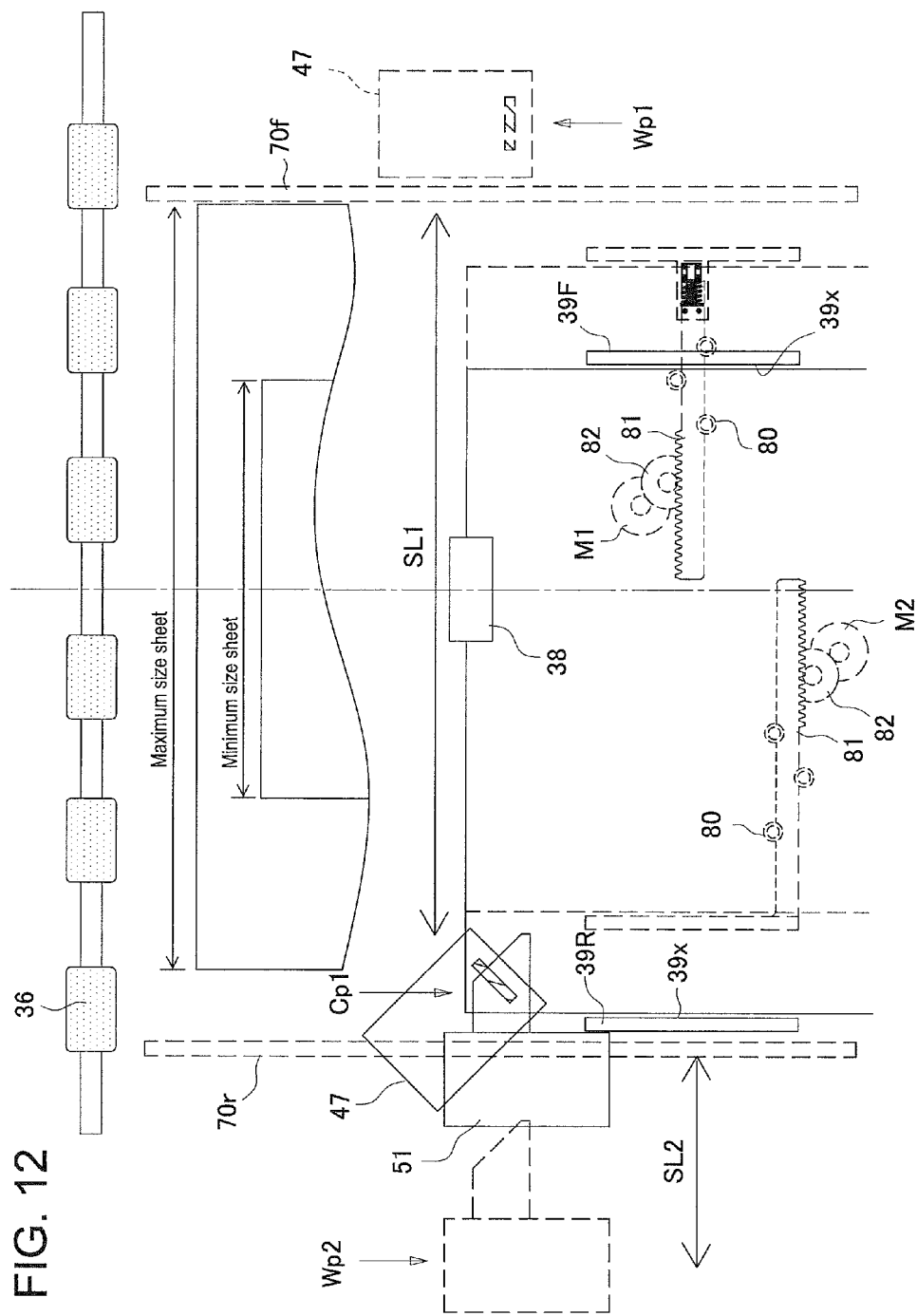
FIG. 12 is an explanatory view illustrating an arrangement relation among alignment positions and the stapling unit in the apparatus of FIG. 2.

As illustrated in FIG. 12, the side edge aligning members 39 (a right side edge aligning member 39F and a left side edge aligning member 39R) are protruded upward from the sheet placement face 37a of the stack portion 37 and arranged as a right-left pair to be mutually opposed, each having a side edge regulating face 39x which is engaged with a side edge of a sheet. The pair of side edge aligning members 39 are arranged at the stack portion 37 to be capable of reciprocating by a predetermined stroke.

The stroke is set in accordance with a size difference between a maximum size sheet and a minimum size sheet and an offset amount of rightward or leftward moving (offset conveying) of an aligned sheet bundle.

That is, the movement stroke of the right-left side edge aligning member 39 (the right side edge aligning member 39F and the left side edge aligning member 39R) is set in accordance with a movement amount for aligning different size sheets and the offset amount of the aligned sheet bundle.

As offset movement of the side edge aligning member 39 (the right side edge aligning member 39F and the left side edge aligning member 39R), a sheet discharged in center reference is moved by a predetermined amount rightward for right corner binding and leftward for left corner binding.

The offset movement is performed one by one (for each introduced sheet) each time when a sheet is introduced to the stack portion 37 or performed for each bundle to be bound after sheets are aligned in a bundle shape.

As illustrated in FIG. 12, the side edge aligning member 39 is structured with the right side edge aligning member 39F (apparatus front side) and the left side edge aligning member 39R (apparatus rear side). Both the side edge aligning members are supported by the stack portion 37 so that the side edge regulating faces 39x which are engaged with side edges of a sheet are mutually moved in a closing direction or a separating direction.

Slit grooves (not illustrated) are formed to penetrate the stack portion 37. The side edge aligning members 39 each having the side edge regulating face 39x which is engaged with a sheet side edge are fitted to the slits toward the upper face of the stack portion 37 in a slidable manner.

The respective side edge aligning members 39 (the right side edge aligning member 39F and the left side edge aligning member 39R) are slidably supported at the back face of the stack portion 37 with a plurality of aligning member guide rollers 80 (or may be a rail member) and an aligning rack 81 is integrally arranged at each of the side edge aligning members 39F, 39R. Aligning motors M1, M2 are connected to the right-left aligning racks 81 respectively via an aligning drive pinion 82.

The right-left aligning motors M1, M2 are structured with stepping motors. Here, positions of the right-left side edge aligning members 39F, 39R are detected by a position sensor (not illustrated). The respective side edge aligning members 39 (the right side edge aligning member 39F and the left side edge aligning member 39R) are structured to be capable of being moved by a specified movement amount in both right and left directions with reference to the detection values.

Here, without adopting the illustrated rack-and-pinion mechanism, it is also possible to adopt a structure that the side edge aligning members 39 (the right side edge aligning member 39F and the left side edge aligning member 39R) are fixed to a timing belt which is connected via a pulley to a motor for causing the timing belt to reciprocate to the right and left.

With the abovementioned structure, the later-described post-processing controller 95 causes the respective side edge aligning members 39 (the right side edge aligning member 39F and the left side edge aligning member 39R) to wait at predetermined waiting positions (positions to be mutually apart by a sheet width+α) based on sheet size information provided from the image forming apparatus A and the like.

In multi-binding operation, the aligning operation is started at timing when a tailing end of a sheet is abutted to the sheet end regulating member 38 after the sheet is introduced onto the stack portion 37. In the aligning operation, the right-left aligning motors M1, M2 are rotated in opposite directions (closing directions) by the same amount.

Sheets introduced onto the stack portion 37 are positioned with reference to the sheet center and stacked into a bundle shape. According to repetition of the introducing operation and the aligning operation of sheets, the sheets are collated and stacked into a bundle shape on the stack portion 37. Here, a sheet having a different size is positioned in center reference as well.

In corner binding operation, the aligning operation is started at timing when a tailing end of a sheet is abutted to the sheet end regulating member 38 after the sheet is introduced onto the stack portion 37.

In the aligning operation, a movement amount of the aligning member at the binding position side is set different from a movement amount of the aligning member at the side opposite to the binding position. The movement amounts are set so that the sheet corner is located at a previously-set binding position.

[Binding Processing Mechanism]

Binding processing mechanism portion (the first binding unit 47 and the second binding unit 51) which performs a binding process on a sheet bundle stacked on the sheet placement face 37a are arranged at the stack portion 37. Sheets are positioned at a predetermined binding position on the sheet placement face 37a of the stack portion 37 by the positioning mechanism (the sheet end regulating member 38 and the side edge aligning member 39).

The binding processing mechanism portion (the first binding unit 47 and the second binding unit 51) is structured so that the first binding unit 47 (stapling unit, as the case may be) which performs a staple binding using a staple on a sheet bundle and the second binding unit 51 (press binding unit, as the case may be) which performs an eco-binding being a non-staple binding without using a staple are arranged contrary at the binding position.

As illustrated in FIG. 2, the binding processing mechanism portion (the first binding unit 47 and the second binding unit 51) which performs a binding process on a tailing end of sheets introduced from the first sheet discharging port 35 is arranged at the stack portion 37. The binding processing mechanism portion includes the stapling unit (first binding unit 47) capable of being moved along the tailing end of the sheet placement face 37a of the stack portion 37 and the press binding unit (second binding unit 51), as illustrated in FIG. 11.

Figure 11:
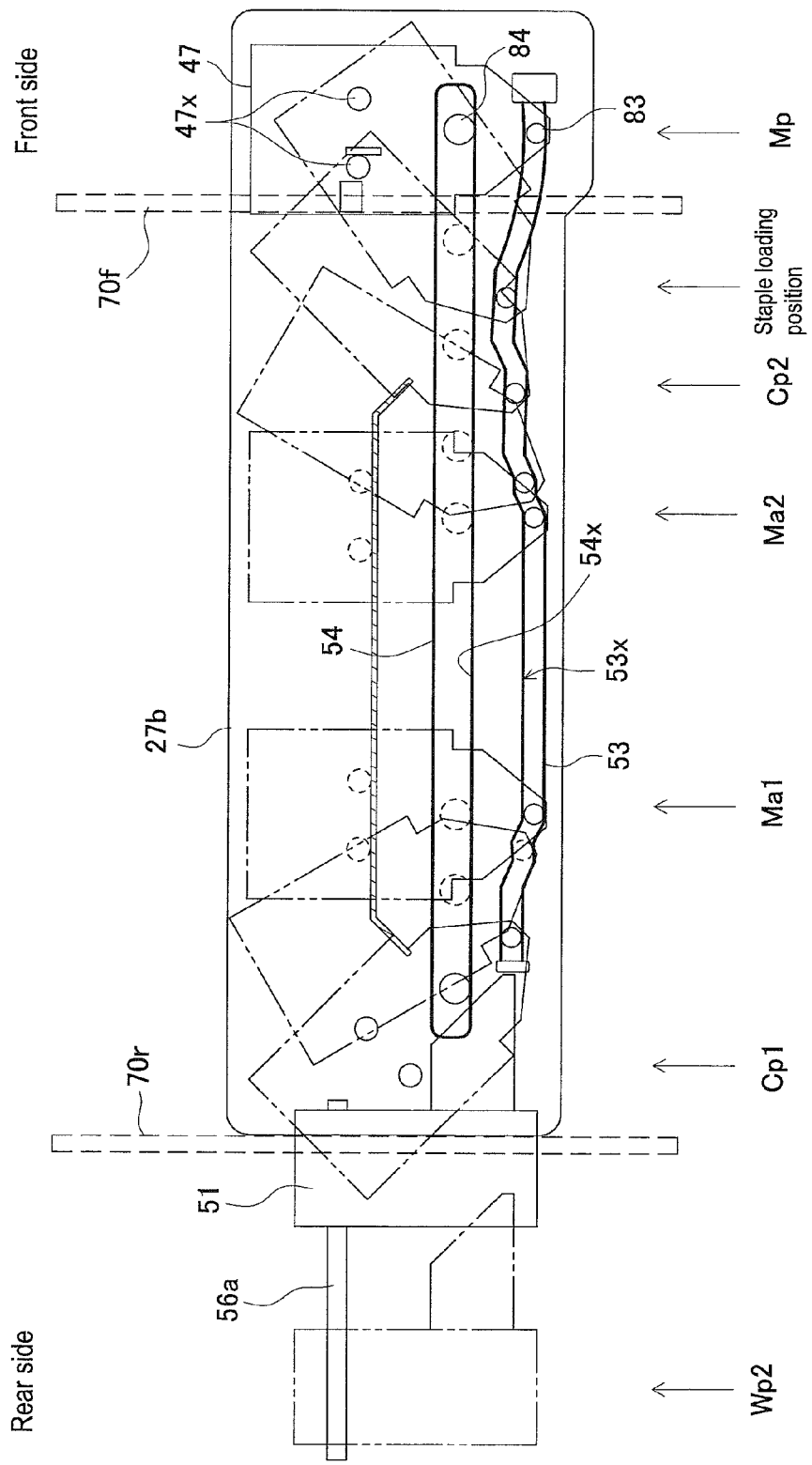
FIG. 11 illustrates a movement trajectory of a stapling unit and a press binding unit.

FIG. 11 illustrates the stapling unit (first binding unit 47) and the press binding unit (second binding unit 51) which are arranged at the stack portion 37. In the illustrated apparatus, a binding position Cp1 is set at a sheet corner located at the upper-left side in the drawing. The first binding unit 47 and the second binding unit 51 are moved contrary to the binding position Cp1.

The first binding unit 47 is moved by a predetermined stroke SL1 along the first travel rail 53 and a second travel rail 54 which are formed at the first binding apparatus frame 27b. Similarly, the second binding unit 51 is moved by a predetermined stroke SL2 along a first guide rod 56a and a second guide rod 56b (see FIG. 21) which are arranged at the second binding apparatus frame 57.

FIG. 12 illustrates a sheet introduced onto the stack portion 37 and movement strokes of the first binding unit 47 and second binding unit 51. Sheets having different sizes (between the maximum size sheet and the minimum size sheet) are introduced onto the stack portion 37 in center reference.

The sheet is aligned by the right-left pair of side edge aligning members 39 (the right side edge aligning member 39F and the left side edge aligning member 39R) (so that sheets having different sizes are matched) with reference to a sheet side edge at the binding side (left side edge in FIG. 12). The right-left side edge aligning members 39 (the right side edge aligning member 39F and the left side edge aligning member 39R) are connected respectively to the separate drive motors M1, M2. The later-described post-processing controller 95 sets movement amount of the right-left side edge aligning members 39 (the right side edge aligning member 39F and the left side edge aligning member 39R) in accordance with sheet sizes.

In a binding process other than the corner binding process, for example, in a later-described multi-binding process, the later-described post-processing controller 95 causes sheets to be aligned in center reference. In this case, the sheets are positioned at the binding position owing to that the right-left side edge aligning members 39 (the right side edge aligning member 39F and the left side edge aligning member 39R) are moved toward the sheet center from the waiting positions by respectively the same amount.

In the following, description is provided with reference to FIG. 12. The first binding unit 47 is moved by the first stroke SL1 between a waiting position Wp1 (first waiting position) and the binding position Cp1. The second binding unit 51 is moved by the second stroke SL2 between a waiting position Wp2 (second waiting position) and the binding position Cp1.

That is, the first binding unit 47 is caused to reciprocate between the first waiting position Wp1 and the binding position Cp1 along the first travel rail 53 and the second travel rail 54 (guide grooves, guide rods, or the like) and the second binding unit 51 is caused to reciprocate between the second waiting position Wp2 and the binding position Cp1 along guide rods 56a, 56b (or may be guide grooves).

Here, the binding position Cp1 is set at a sheet corner (hereinafter, called a set binding position). The first waiting position Wp1 and the second waiting position Wp2 satisfy following relations with the set binding position Cp1.

(1) The first waiting position Wp1 and the second waiting position Wp2 are located at opposite sides as sandwiching the set binding position Cp1.
(2) The first waiting position Wp1 is set at the outer side of the maximum size sheet on which a binding process is to be performed on the stack portion 37 or a binding processing position being farthest from the set binding position Cp1 on the stack portion 37 (a later-described multi-binding position Ma or the manual binding position Mp; the farthest binding position).

(3) The second waiting position Wp2 is set at the outer side of the sheet side edge aligned at the set binding position (outside a sheet placement area of the sheet placement face).

(4) The first stroke SL1 between the first waiting position Wp1 and the set binding position Cp1 is set larger (longer) than the second stroke SL2 between the second waiting position Wp2 and the set binding position Cp1.

Owing to that the first waiting position Wp1 and the second waiting position Wp2 are set at opposite sides with respect to the set binding position Cp1 as described above, it is possible that one binding unit is moved in a separating direction while the other binding unit is moved in a closing direction (a contrary retracting-closing operation). Further, owing to that the first stroke SL1 is set larger than the second stroke SL2, the binding processing position (the later-described multi-binding position Ma) of the first binding unit 47 can be set relatively freely. In contrast, the second binding unit 51 performs a binding process only at a previously-set binding position. According to the above, the length of the total movement stroke of the first binding unit 47 and the second binding unit 51 can be set small and the apparatus can be miniaturized.

Further, the later-described post-processing controller 95 causes the first binding unit 47 and the second binding unit 51 to move in a contrary manner so that the second binding unit 51 is located at the second waiting position Wp2 when the first binding unit 47 is at the set binding position Cp1 and the first binding unit 47 is located at the waiting position Wp1 when the second binding unit 51 is at the set binding position Cp1.

The contrary movement of the first binding unit 47 and the second binding unit 51 is performed with a method of (1) differentiating rotational amounts in accordance with movement strokes with separate drive motors, or (2) differentiating movement amounts between the first binding unit 47 and the second binding unit 51 with the same drive source.

Figure 13:
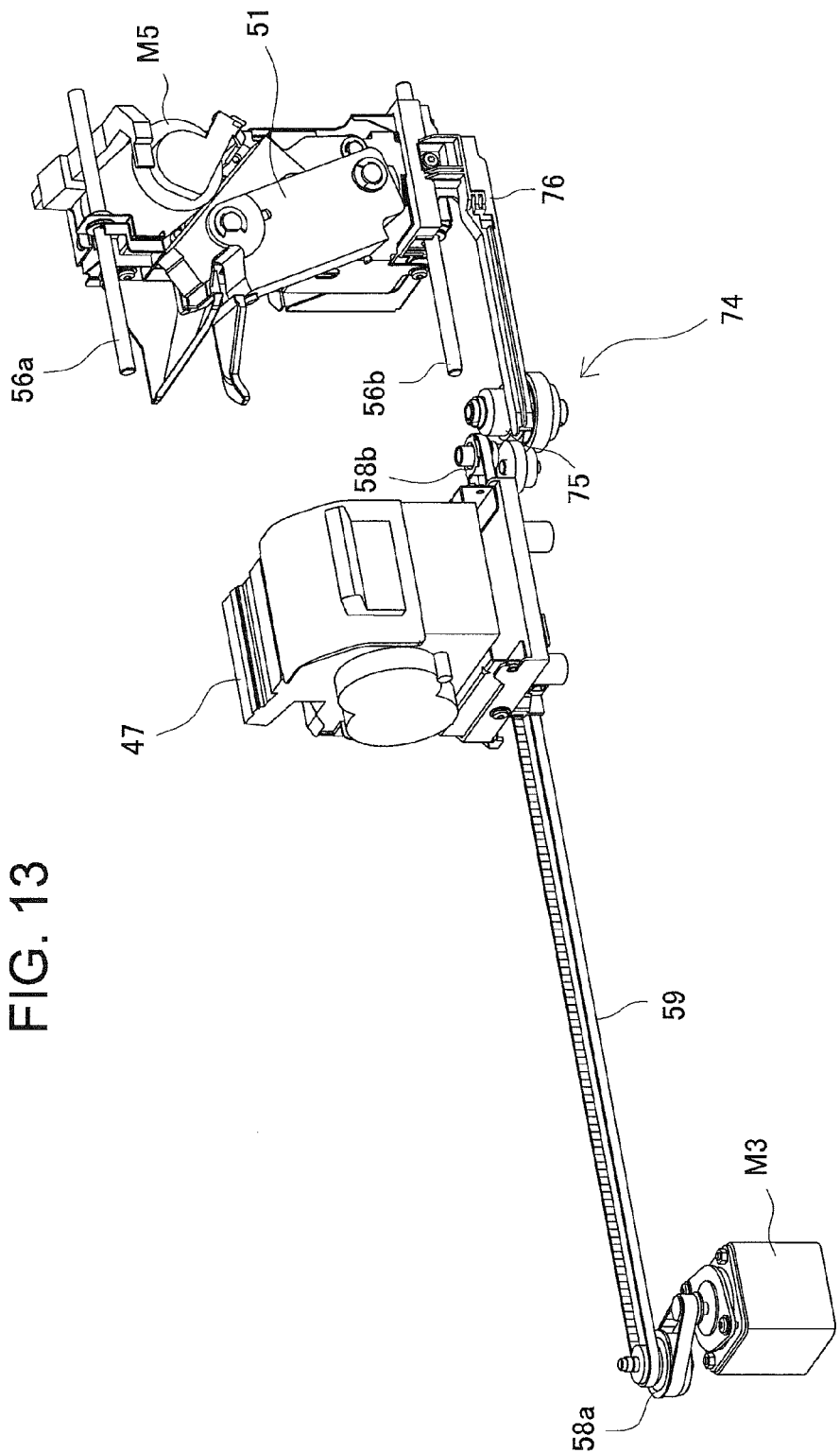
FIG. 13 is an explanatory view of a differential device of a binding device in the apparatus of FIG. 2.

FIG. 13 illustrates an embodiment to differentiate movement amounts of the first binding unit 47 and the second binding unit 51 with the same drive source. A right-left pair of pulleys 58a, 58b are arranged at the first binding apparatus frame 27b along a movement area of the first binding unit 47 (in the right-left direction in FIG. 13). A timing belt (toothed belt) 59 is routed between the pulleys 58a, 58b and a drive motor M3 (stepping motor) is connected to one pulley 58a.

A binding movement transmitting pinion 75 is connected to the other pulley 58b via a differential device (transmitting device) 74. A press rack 76 which is fixed to the second binding apparatus frame 57 of the second binding unit 51 is engaged with the binding movement transmitting pinion 75.

The differential device 74 is structured with a gear mechanism, a slide clutch mechanism, or the combination of both the mechanisms having a transfer ratio matched to the difference between the first and second strokes SL1, SL2.

[Moving Mechanism of Stapling Unit]

As illustrated in FIG. 3, the stapling unit (first binding unit 47) is mounted, movably by a predetermined stroke, on the first binding apparatus frame 27b which is fixed to the side frame 70f and the side frame 70r as passing through the opening 70x formed at the side frame 70f of the apparatus frame 70. The first travel rail 53 and the second travel rail 54 are arranged at the first binding apparatus frame 27b.

A travel rail face 53x is formed at the first travel rail 53 and a travel cam face 54x is formed at the second travel rail 54. The travel rail face 53x and the travel cam face 54x in mutual cooperation support the stapling unit (first binding unit 47) to be capable of reciprocating by a predetermined stroke and control an angular posture thereof.

The first travel rail 53 and the second travel rail 54 are formed so that the travel rail face 53x and the travel cam face 54x allow the stapling unit (first binding unit 47) to reciprocate within a movement range of the moving unit (see FIG. 11). The timing belt 59 which is connected to the drive motor M3 is fixed to the stapling unit (first binding unit 47).

The timing belt 59 is wound to the pair of pulleys 58a, 58b which are axially-supported by the first binding apparatus frame 27b and the drive motor M3 is connected to one pulley.

According to the above, the stapling unit (first binding unit 47) reciprocates by the stroke SL1 with forward and reverse rotation of the drive motor M3.

The first binding unit 47 is engaged with the first travel rail 53 and the second travel rail 54 as described below. As illustrated in FIG. 3, the first binding unit 47 is provided with a first rolling roller (rail fitting member) 83 which is engaged with the travel rail face 53x and a second rolling roller (cam follower member) 84 which is engaged with the travel cam face 54x.

Further, the first binding unit 47 is provided with a ball-shaped sliding roller 47x (at two positions in the drawing) which is engaged with a support face of the first binding apparatus frame 27b.

Further, a binding unit guide roller 47y which is engaged with a bottom face of a bottom frame is formed at the first binding unit 47 to prevent the first binding unit 47 from floating from the first binding apparatus frame 27b.

According to the above structure, the first binding unit 47 is supported by the first binding apparatus frame 27b movably via the sliding rollers 47x and the binding unit guide roller 47y. Further, the first rolling roller 83 and the second rolling roller 84 are rotated and moved along the travel rail face 53x and the travel cam face 54x respectively as following the travel rail face 53x and the travel cam face 54x respectively.

[Tray Lifting-Lowering Mechanism]

Figure 14:
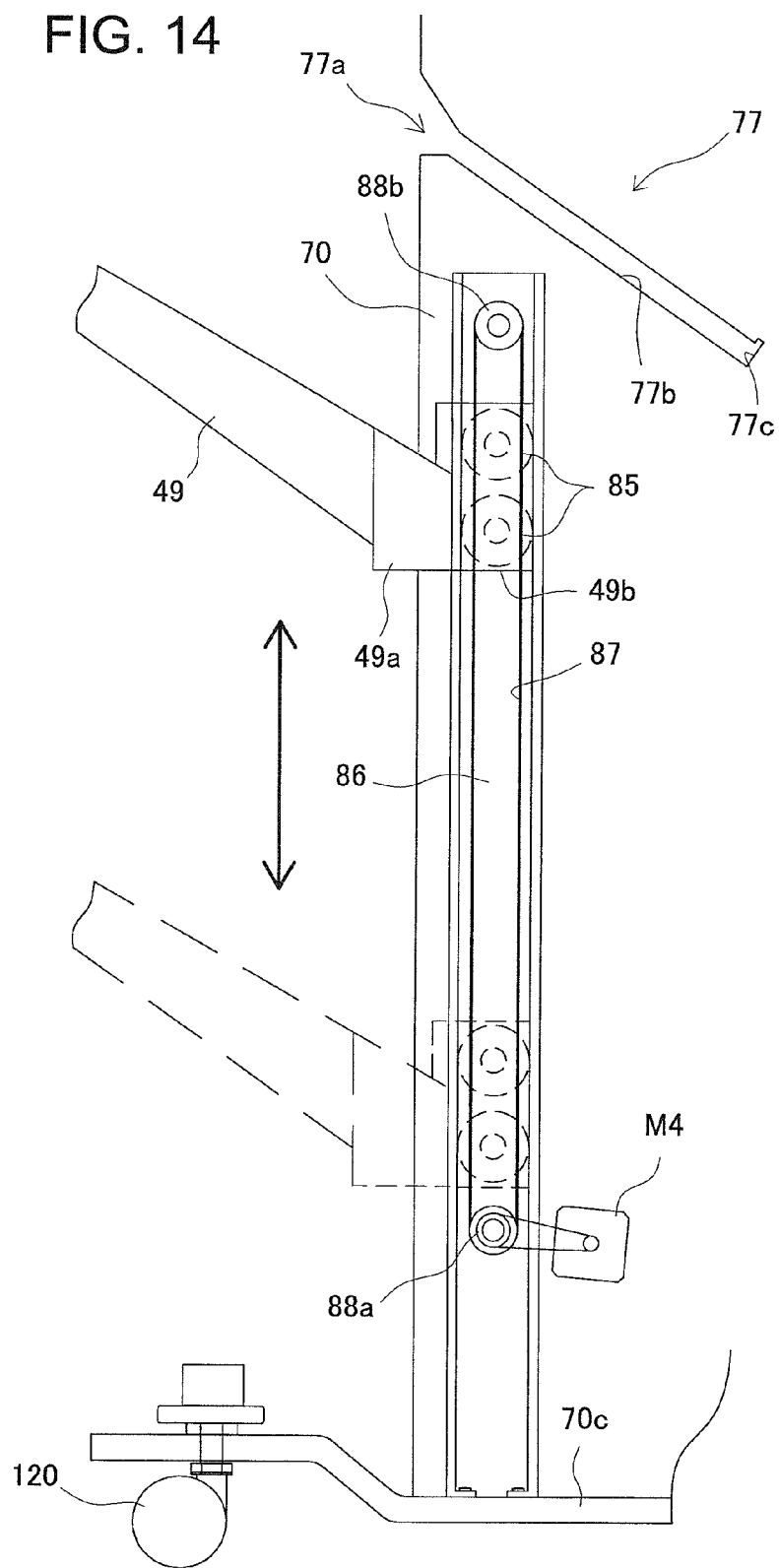
FIG. 14 is an explanatory view of a lifting-lowering mechanism of a tray in the apparatus of FIG. 2.

In the sheet post-processing apparatus B, the first tray member 49 is arranged at the external casing 73 as illustrated in FIG. 14. The first tray member 49 includes a tray storing face on which sheets are stacked and is configured to be movable upward and downward (lifted and lowered) in the sheet stack direction in accordance with a stack amount of sheets stored on the tray storing face. As illustrated in FIG. 14, tray guide rollers 85 are arranged at two positions at upper and lower sides of a base end part of the first tray member 49. The tray guide rollers 85 are fitted to and supported by a lifting-lowering guide member 86 which is arranged at the apparatus frame 70.

Then, the base end part of the first tray member 49 is connected to a lifting-lowering belt 87. The lifting-lowering belt 87 is supported by an upper-lower pair of pulleys 88a, 88b. A lifting-lowering motor M4 is connected to one pulley (drive-side pulley) 88a.

Thus, the first tray member 49 is moved upward and downward (lifted and lowered) in the sheet stack direction in accordance with a stack amount of sheets owing to that the lifting-lowering motor M4 is rotationally controlled.

The lifting-lowering guide members 86 are integrally attached respectively to the side frame (front side frame) 70f and the side frame (rear side frame) 70r at opposed positions. At a tray base body 49*a* of the first tray member 49, the tray guide rollers 85 are attached to a slide member 49*b* which is fitted to the right-left lifting-lowering guide members 86.

According to the above, the first tray member 49 attached to the tray base body 49*a* is slidably supported along the lifting-lowering guide members 86.

Figure 15:
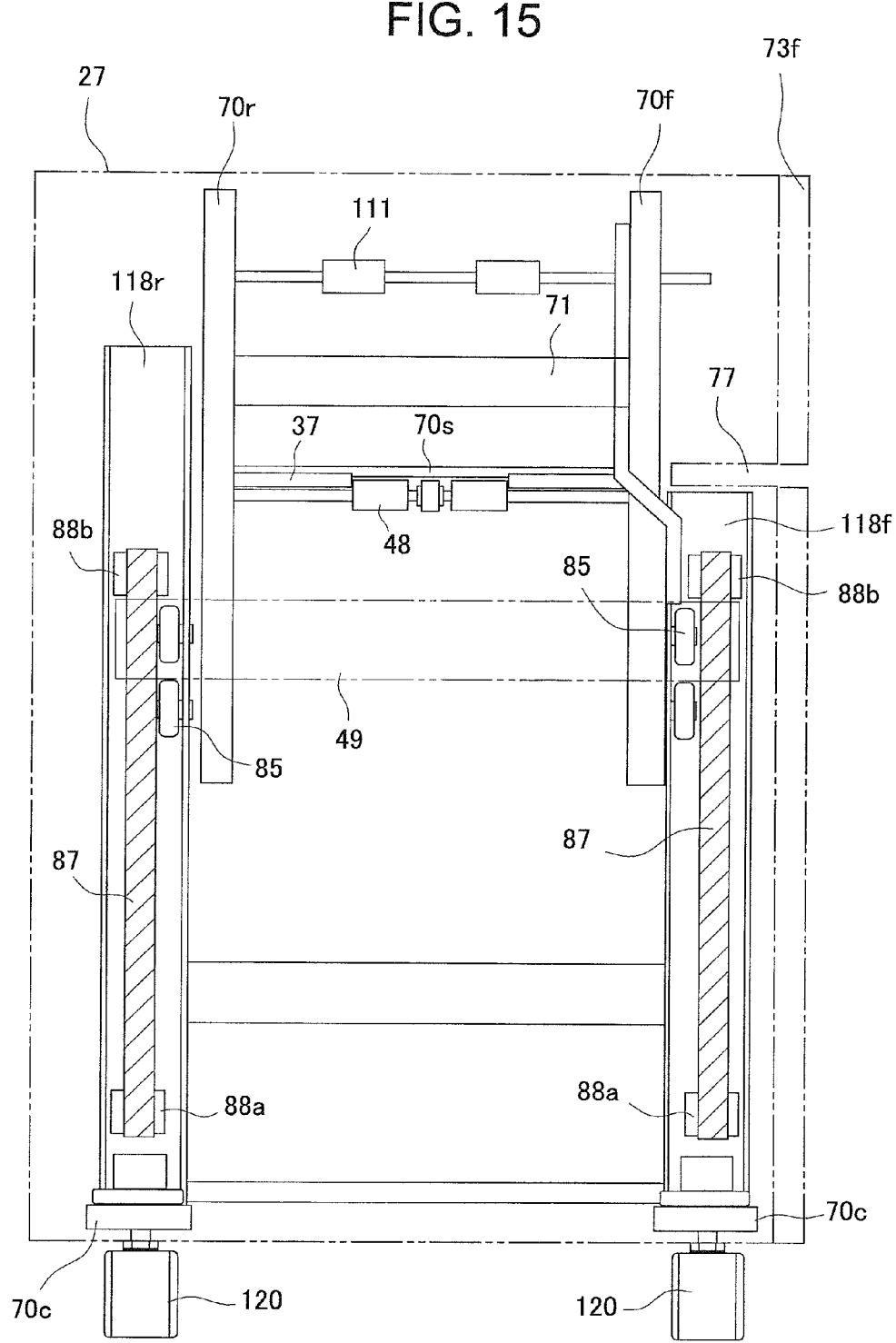
FIG. 15 is an explanatory view of a frame structure in the apparatus of FIG. 2.

In the illustrated apparatus, as illustrated in FIG. 15, a support frame 118*f* and a support frame 118*r* are integrally arranged respectively at the side frame 70*f* and the side frame 70*r* in the apparatus height direction as reinforcing frames to reinforce the whole apparatus frame. The lifting-lowering guide members 86 are formed respectively at the support frame 118*f* and the support frame 118*r*.

Further, a support frame 118 which includes the support frame 118*f* and the support frame 118*r* are connected to a bottom frame 70*c*. Later-described emplacement legs 120 are attached to the bottom frame 70*c*.

Figure 16:
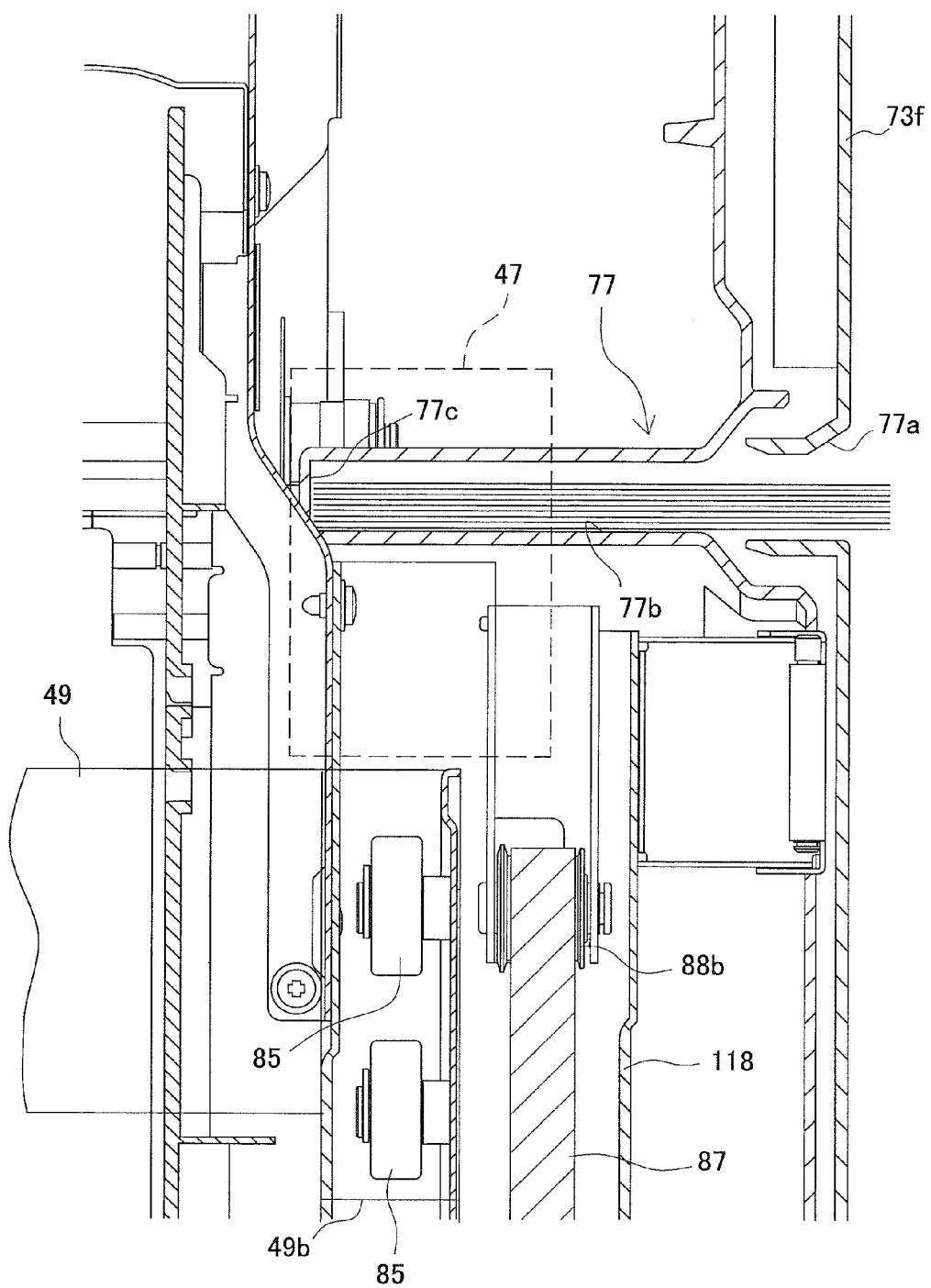
FIG. 16 is an enlarged view of a main part of FIG. 12.
Figure 17:
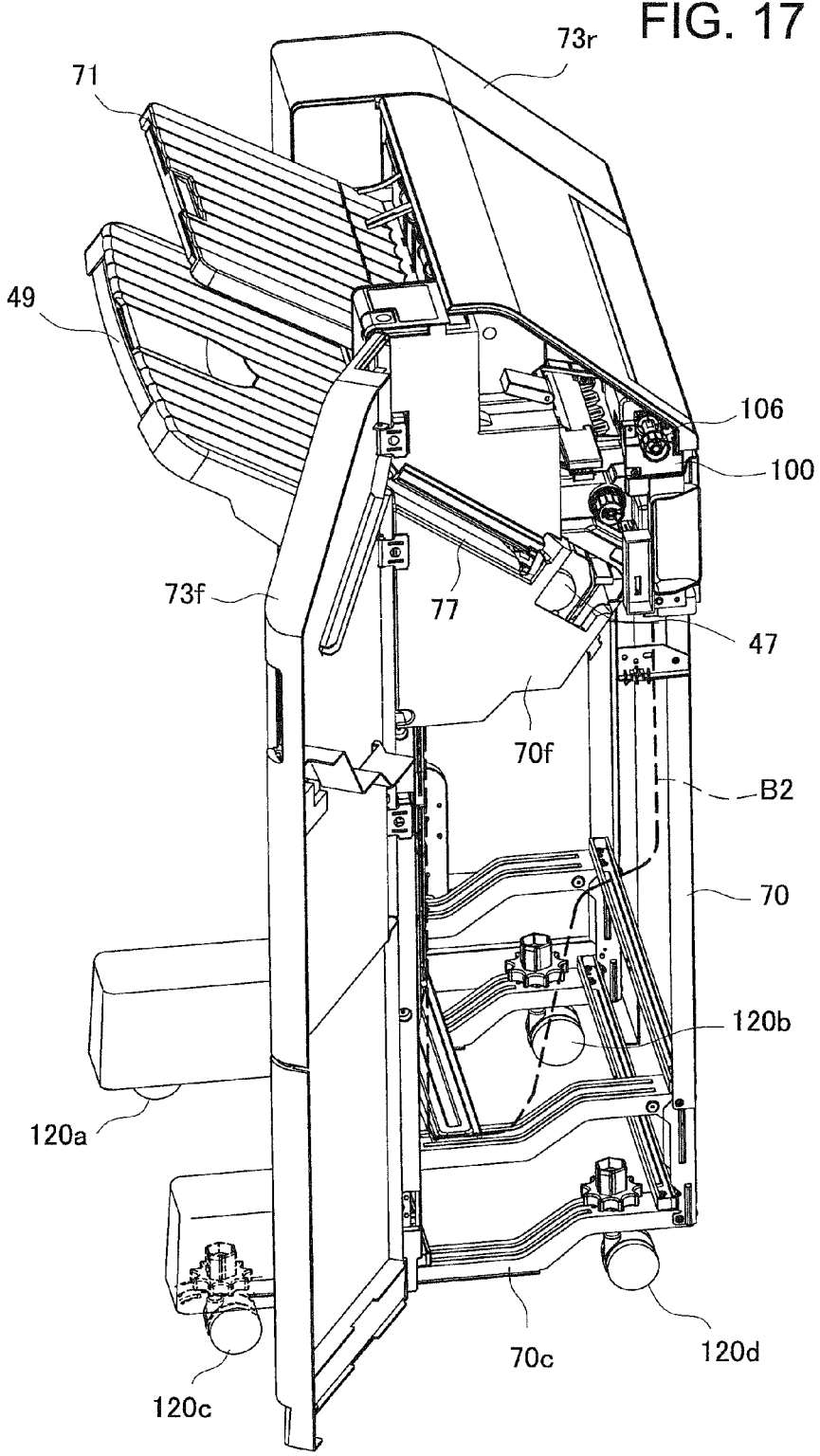

A positional relation between the support frame 118 and the setting portion 77 is described with reference to FIG. 16. As illustrated in FIG. 16, the slit-shaped opening 77*a*, the setting face 77*b*, and the position regulating face 77*c* of the setting portion 77 described above are arranged above the support frame 118.

The slit-shaped opening 77*a* is formed at the side chassis (front cover 73*f*) which is located at the front side of the external casing 73. The setting face 77*b* and the position regulating face 77*c* are attached to the apparatus frame (in the drawing, the side frame 70*f* at the front side).

Thus, the setting face 77*b* for manually inserting a sheet bundle from the outside and the position regulating face 77*c* are arranged above the support frame 118 which structures the apparatus frame 70. Accordingly, a risk of being deformed is reduced even when a large external force is exerted on the whole apparatus.

Here, in a case that the stapling unit (first binding unit 47) is arranged at the setting face 77*b* as the binding processing mechanism portion, a load of the stapling unit (first binding unit 47) itself and a load of a moving mechanism therefor are supported by the support frame 118.

[Caster Mechanism]

Emplacement legs 120*a* to 120*d* are attached to the apparatus frame 70 at a plurality (in the drawing, four) of positions. A rod-shaped support portion 121 and an emplacement portion 122 are arranged at each of the emplacement legs 120. The emplacement portion 122 includes an emplacement face 122*x* which contacts to a floor face and the rod-shaped support portion 121 connects the apparatus frame 70 and the emplacement portion 122. In the drawing, the emplacement portion 122 is structured with a rolling roller.

The bottom frame 70*c* is connected respectively to the side frame 70*f* at the front side and the side frame 70*r* at the rear side integrally with bolt connection, welding connection, or the like. The emplacement legs 120 are attached to the side frame 70*f* and the side frame 70*r* at intervals as being adjustable in height.

Next, description is provided on a structure of the emplacement leg 120 which is adjustable in height as illustrated in FIGS. 18 and 19. As illustrated in a perspective view of FIG. 18, the emplacement leg 120 is structured with the rod-shaped support portion 121 and the emplacement portion 122. The emplacement portion 122 is structured with a movable wheel and the rod-shaped support portion 121 is structured with a bolt-shaped shaft member. The emplacement portion 122 is structured with a roller which is rotatable about the center of the rod-shaped support member 121 and rolled owing to friction with the emplacement face 122*x*.

Meanwhile, a nut-shaped fit portion 123 to which the emplacement leg 120 is attached is arranged at the apparatus frame 70. In the drawing, the nut-shaped fit portion 123 is arranged at the bottom frame 70*c*.

A bolt-shaped fit portion 125 is arranged at least at a part of the rod-shaped support portion 121 to be fitted to the nut-shaped fit portion 123. Thread grooves are formed respectively at the bolt-shaped fit portion 125 and the nut-shaped fit portion 123 for mutual screwing.

According to the above, when one of the bolt-shaped fit portion 125 and the nut-shaped fit portion 123 is rotated, the emplacement leg 120 is moved in the height direction.

The illustrated apparatus is provided with an operation dial 126 for rotating either the bolt-shaped fit portion 125 or the nut-shaped fit portion 123, a lock device which prevents the rotation thereof, and a lock release device to allow the rotation. FIG. 19A illustrates a locked state and FIG. 19B illustrates a lock-released state.

In the illustrated embodiment, the operation dial 126 for rotating the bolt-shaped fit portion 125 (which is integrally formed with the rod-shaped support portion 121) is arranged at the rod-shaped support portion 121. A non-circular head portion 121*a* (fit ring) is integrally formed with the rod-shaped support portion 121 and the operation dial 126 is fitted to a head portion 121*a* thereof as being slidable in the axial direction. In the drawing, the head portion 121*a* and the inner shape of the operation dial 126 are fitted in octagon shapes.

Here, the inner diameter of the operation dial 126 is slightly larger than the outer diameter of the head portion 121*a*. Accordingly, the operation dial 126 is easily moved in the axial direction with respect to the head portion 121*a* and is rotated integrally with the head portion 121*a*. That is, the operation dial 126 is freely moved upward and downward in the axial direction with respect to the head portion 121*a* and is integrally rotated in the rotation direction.

Further, at the apparatus frame side, a lock portion 70*d* which prevents rotation of the operation dial 126 as being fitted thereto is arranged at the vicinity of the nut-shaped fit portion 123. Here, the lock portion 70*d* is arranged at a position to be fitted to the operation dial 126 which is moved in a sliding manner in the axial direction.

The head portion 121*a* and the lock portion 70*d* are arranged at upper and lower sides in the axial direction of the rod-shaped support portion 121 as being mutually spaced. The operation dial 126 which is fitted to the rod-shaped support portion 121 is vertically moved between a position for being engaged with the head portion 121*a* and a position for being engaged with the lock portion 70*d*.

An urging device 129 (coil spring) which urges the operation dial 126 in one direction (in the drawing, a locking direction) is arranged between the head portion 121*a* and the operation dial 126. FIG. 19A illustrates a locked state (a state in which the operation dial 126 is locked to the lock portion 70*d* with the coil spring) and FIG. 19B illustrates a lock-released state (a state in which the operation dial 126 is separated off from the lock portion 70*d*).

As is clear from the drawings, the operation dial 126 is fitted to the lock portion 70*d* formed at the apparatus frame 70 by the action of the urging device 129 such as an urging spring, so that the operation dial 126 is supported as being incapable of being rotated in the above state.

In contrast, when the operation dial 126 is separated from the lock portion 70*d* (is moved to a non-fit position) against an urging force of the urging device 129, the operation dial 126 becomes capable of being rotated and the rotation is transmitted to the rod-shaped support portion 121 via the head portion 121a.

When the rod-shaped support portion 121 is rotated, the height position of the emplacement portion 122 is adjusted in height by the action of the bolt-shaped fit portion 125 arranged at the rod-shaped support portion 121 and the nut-shaped fit portion 123 at the apparatus frame side.

[Sheet Bundle Discharging Mechanism]

The sheet bundle discharging mechanism which discharges a bound sheet bundle toward the first tray member 49 at the downstream side is arranged at the stack portion 37. For conveying a sheet bundle toward the downstream side, there have been known a method for conveying with a pair of rollers which are pressure-contacted to each other (a conveying roller device) and a conveying device for pushing out a sheet tailing end with a push-out member which is moved along a tray face from the upstream side to the downstream side. The illustrated apparatus adopts both the devices.

Figure 20A:
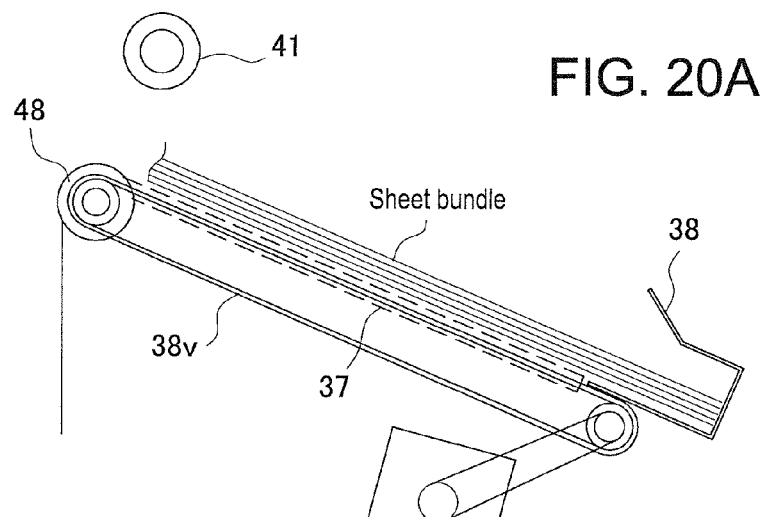

FIG. 20 illustrates the sheet bundle discharging mechanism. A conveying device is structured with a push-out projection (the sheet end regulating member 38 which is supported movably in the sheet discharging direction) which conveys sheets along the stack portion 37 from the binding position (processing position) located at the upstream side to the stack tray (first tray member 49) at the downstream side, a conveying belt 38v which moves the push-out projection 38, and a drive motor M6 therefor.

The conveying roller device 48 is arranged at a discharging port of the stack portion 37 (at the boundary between the sheet placement face 37a and the first tray member 49). The lifting-lowering roller 41 which is pressure-contacted to the conveying roller device 48 is arranged in the abovementioned structure as being opposed thereto. Thus, the conveying roller device 48 and the lifting-lowering roller 41 structure a discharging roller device.

As described above, the conveying device (the sheet end regulating member 38 which is supported movably in the sheet discharging direction and the conveying belt 38v) which pushes out a sheet bundle from the upstream side to the downstream side, the discharging roller device 48, and the lifting-lowering roller 41 which nip and discharge the sheet bundle are arranged at the stack portion 37.

FIG. 29A illustrates a state that a sheet bundle is located at the binding position on the stack portion 37. At this time, the conveying device (the sheet end regulating member 38 which is supported movably in the sheet discharging direction and the conveying belt 38v), the discharging roller device 48, and the lifting-lowering roller 41 are in an operating state.

Figure 20B:
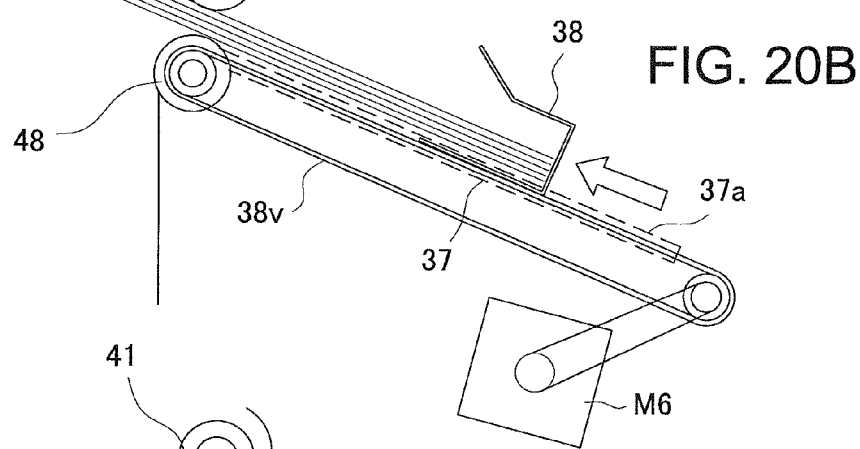

FIG. 20B illustrates a midstream state of conveying the sheet bundle from the processing position to the downstream side. The sheet bundle is conveyed to the downstream side owing to movement of the push-out projection (the sheet end regulating member 38 which is supported movably in the sheet discharging direction) and rotation of the discharging roller device 48 and the lifting-lowering roller 41.

Figure 20C:
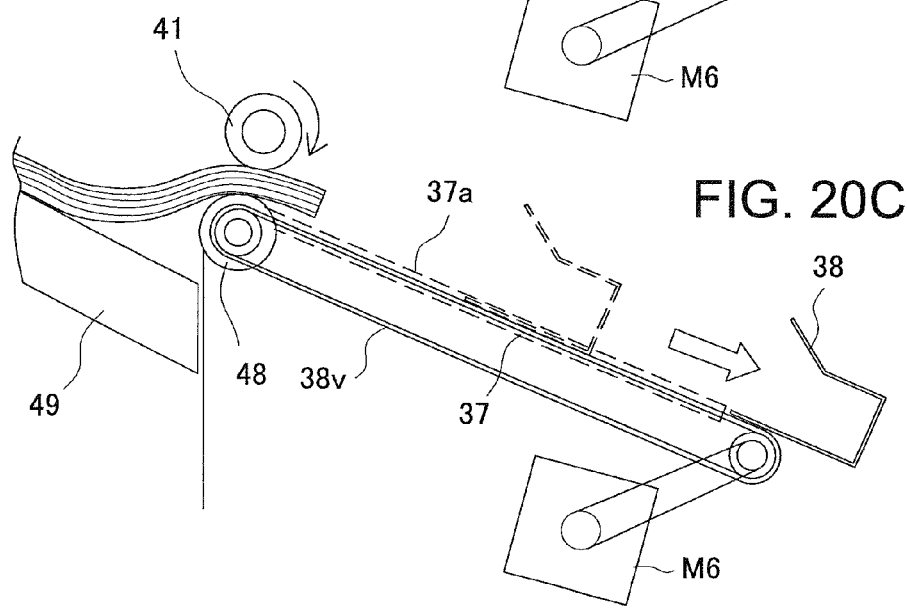

FIG. 20C illustrates a state right before the sheet bundle is discharged onto the first tray member 49 at the downstream side. On the stack portion 37, the sheet bundle is conveyed slowly (at low speed) to the downstream side with rotation of the discharging roller device 48 and the lifting-lowering roller 41. At that time, the push-out projection (the sheet end regulating member 38 which is supported movably in the sheet discharging direction) is kept waiting at the illustrated position as being returned to the initial position (moved rearward).

[Structure of Stapling Unit]

Figure 21A:
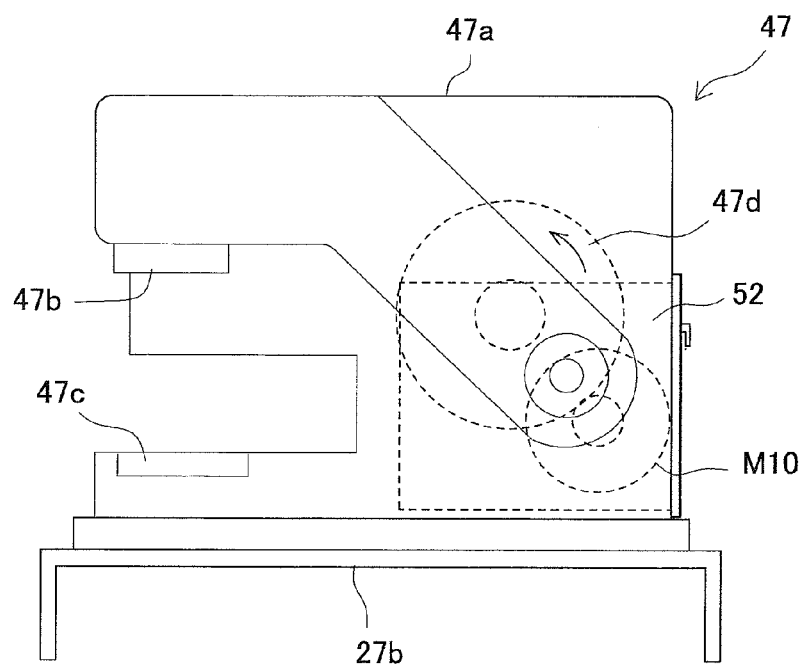

A structure of the stapling unit will be described with reference to FIG. 21A. The stapling unit (first binding unit 47) is structured as a unit separated from the sheet processing apparatus B. The stapling unit 47 includes a box-shaped staple unit frame 47a, a staple drive cam 47d which is swingably axially-supported by the unit frame 47a, and a drive motor M10 which is mounted on the staple unit frame 47a to rotate the staple drive cam 47d.

A stapling head 47b and an anvil member 47c are arranged at the binding position as being mutually opposed. The stapling head 47b is vertically moved between a waiting position at the upper side and a stapling position at the lower side (the anvil member 26c) with the staple drive cam 47d and an urging spring (not illustrated). Further, the staple cartridge 52 is mounted on the staple unit frame 47a in a detachably attachable manner.

Linear blank staples are stored in the staple cartridge 52 and fed to the stapling head 47b by a staple feeding mechanism. A former member to fold a linear staple into a U-shape and a driver to cause the folded staple to bite into a sheet bundle are built in the stapling head 47b. With such a structure, the staple drive cam 47d is rotated by the drive motor M10 and energy is stored in the urging spring.

When the rotational angle reaches a predetermined angle, the stapling head 47b is vigorously lowered toward the anvil member 47c. Owing to this action, a staple is caused to bite into a sheet bundle with the driver after being folded into a U-shape. Then, leading ends of the staple are folded by the anvil member 47c, so that the staple binding is completed.

The stapling feeding mechanism is built in between the staple cartridge 52 and the stapling head 47b. A sensor (empty sensor) to detect staple absence is arranged at the staple feeding mechanism. Further, a cartridge sensor (not illustrated) to detect whether or not the staple cartridge 52 is inserted is arranged at the staple unit frame 47a.

The illustrated staple cartridge 52 adopts a structure that belt-shaped connected staples are stacked and stored as being layered or are stored in a roll-shape in a box-shaped cartridge.

Further, a circuit to control the abovementioned sensors and a circuit board to control the drive motor M10 are arranged at the staple unit frame 47a and transmit an alarm signal when the staple cartridge 52 is not mounted or the staple cartridge 52 is empty. Further, the stapling control circuit controls the drive motor M10 to perform the stapling operation with a staple signal and transmits an operation completion signal when the stapling head 47b is moved to an anvil position from the waiting position and returned to the waiting position.

[Structure of Press Binding Unit (Non-Staple Binding Unit)]

A structure of the press binding unit (second binding unit 51) will be described with reference to FIG. 21B. As a binding device to perform a binding process on a sheet bundle without using a metal staple, there have been known a device to bind sheets by pressure-nipping a sheet bundle from front and back sides with pressurizing members which have concave-convex faces to be mutually engaged (a press binding apparatus), a device to bind sheets with folding after a slit-shaped cutout is formed at the sheet bundle (a cutout fold binding apparatus; see Japanese Patent Application Laid-open No. 2011-256008), and a device to bind sheets with a plant-derived resin string (resin string binding apparatus).

Since a sheet bundle is bound without using a metal staple, such a method is known as an eco-binding method. In the following, a press binding mechanism is described as an example thereof.

With a press binding mechanism, concave-convex faces are formed on pressurizing faces 51b, 51c which can be pressure-contacted and separated to each other and a sheet bundle is pressure-nipped from front and back sides, so that sheets are deformed and bound.

Figure 21B:
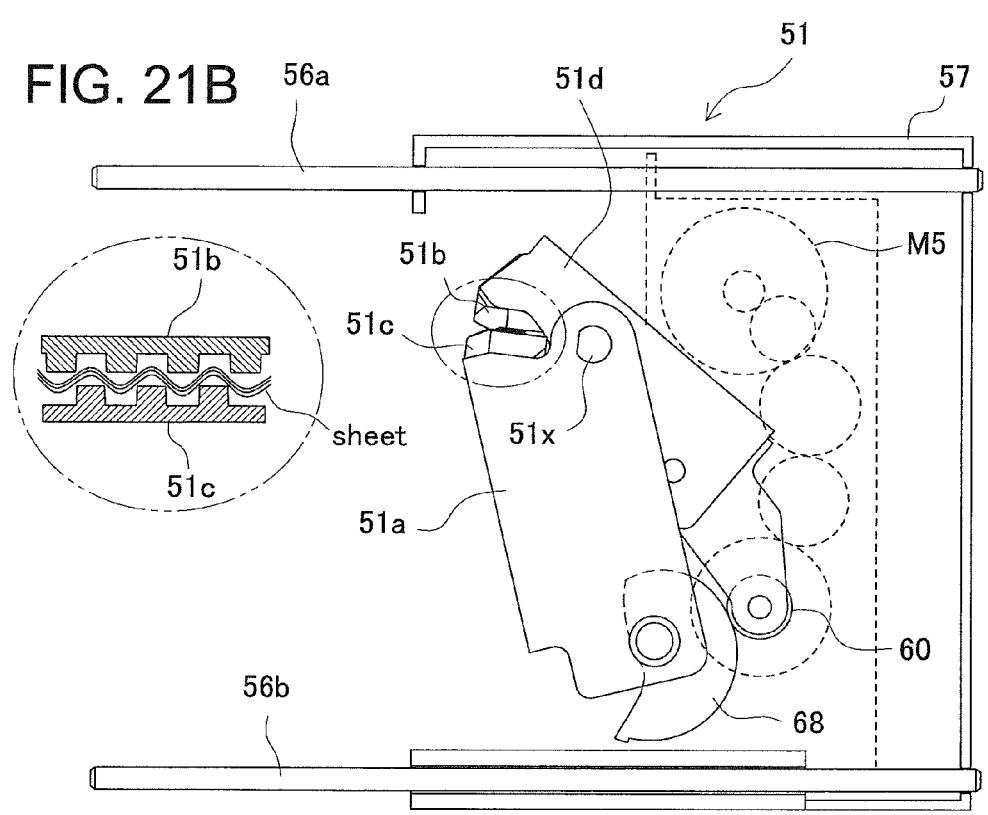

FIG. 21B illustrates the press binding unit (second binding unit 51). A movable frame member 51d is swingably axially-supported by a base frame member 51a and both the frame members 51a, 51d are swung about a support shaft 51x as being capable of being mutually pressure-contacted and separated. A follower roller 60 is arranged at the movable frame member 51d and is engaged with a press drive cam 68 arranged at the base frame member 51a.

A drive motor M5 arranged at the base frame member 51a is connected to the press drive cam 68 via a deceleration mechanism. Rotation of the drive motor M5 causes the press drive cam 68 to be rotated and the movable frame member 51d is swung by a cam face (eccentric cam in FIG. 21B) thereof.

The lower pressurizing face 51c and the upper pressurizing face 51b are arranged respectively at the base frame member 51a and the movable frame member 51d as being mutually opposed. An urging spring (not illustrated) is arranged between the base frame member 51a and the movable frame member 51d to urge both the pressurizing faces 51c, 51b respectively in a direction to be separated.

As illustrated in an enlarged view of FIG. 21B, convex stripes are formed on one of the upper pressurizing face 51b and the lower pressurizing face 51c and convex grooves to be matched therewith are formed on the other thereof. The convex stripes and the concave grooves are formed respectively into rib shapes as having predetermined length.

A sheet bundle nipped between the upper pressurizing face 51b and the lower pressurizing face 51c is intimately contacted as being deformed into a corrugation shape. A position sensor (not illustrated) is arranged at the base frame member 51a (press unit frame) and detects whether or not the upper pressurizing face 51b and the lower pressurizing face 51c are at the pressurization positions or separated positions.

The press binding unit (second binding unit 51) structured as described above is movably arranged on the first and second guide rods 56a, 56b (may be grooves as well) which are arranged at the second binding apparatus frame 57 attached to the side frame 70r and reciprocates between the second waiting position Wp at the rear side of the side frame 70r and the set binding position Cp1 for sheets stacked on the stack portion 37 located between the side frame 70f and the side frame 70r, as described above.

[Description of Control Configuration]

Figure 22:
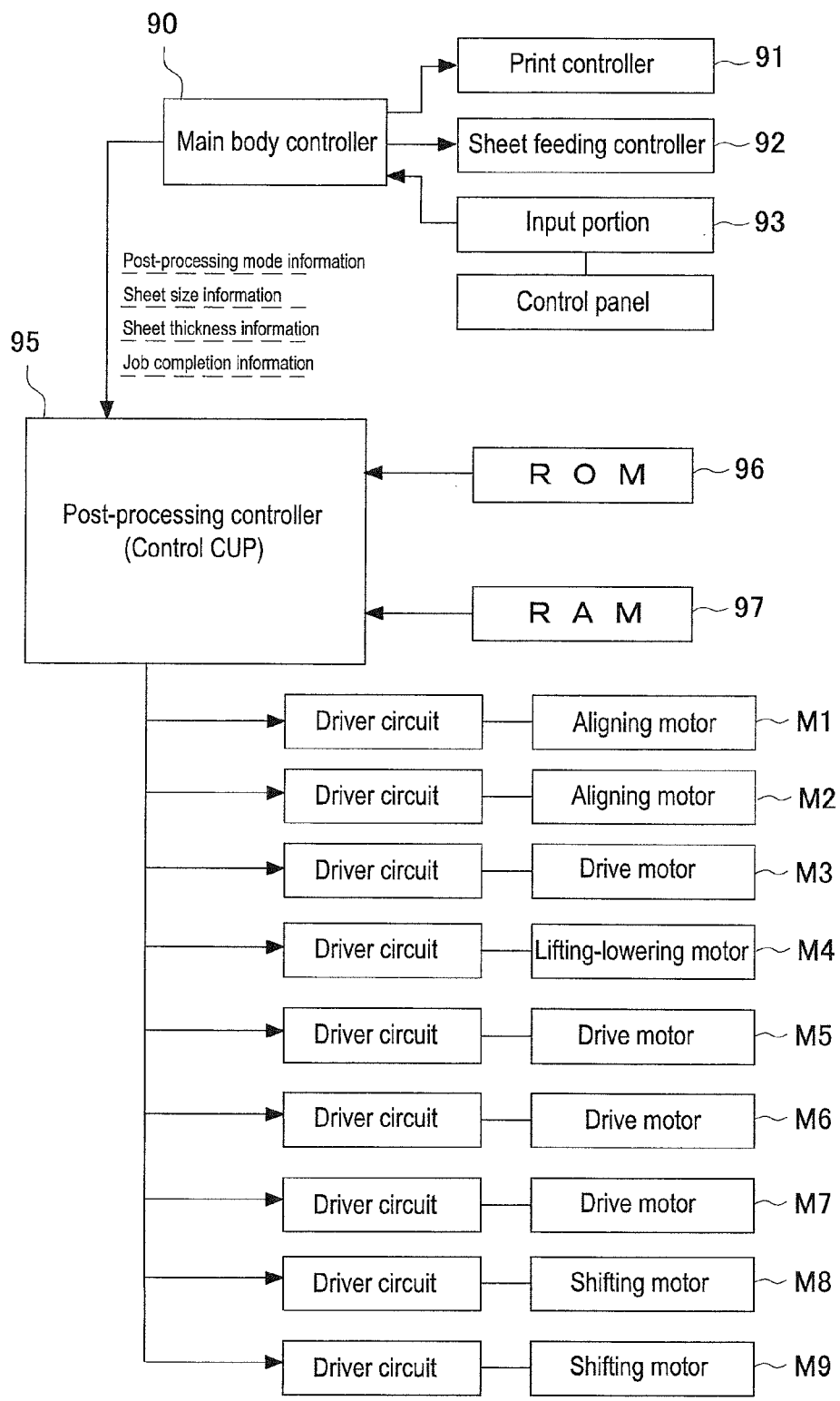
FIG. 22 is a block diagram illustrating a control configuration of the apparatus of FIG. 1.

A control configuration of the image forming system in FIG. 1 will be described with reference to FIG. 22. The image forming system illustrated in FIG. 22 includes a controller (hereinafter, called a main body controller) 90 for the image forming apparatus A and a controller (hereinafter, called a post-processing controller) 95 for the sheet processing apparatus B. The main body controller 90 includes a print controller 91, a sheet feeding controller 92, and an input portion (control panel) 93.

Setting of an image forming mode and a post-processing mode is performed with the input portion (control panel) 93. The image forming mode requires setting of mode setting such as color/monochrome printing and double-face/single-face printing, and image forming conditions such as a sheet size, sheet quality, the number of copies, and enlarged/reduced printing. The post-processing mode is required to be set, for example, to a printout mode, a staple binding processing mode, an eco-binding processing mode, or a jog sorting mode. Further, the illustrated apparatus includes a manual binding mode. In this mode, operation of a sheet bundle binding process is performed offline as being separate from the main body controller 90 for the image forming apparatus A.

The main body controller 90 transfers, to the post-processing controller 95, selection of the post-processing mode and data such as the number of sheets, the number of copies, and thickness of sheets on which images are formed. Further, the main body controller 90 transfers a job completion signal to the post-processing controller 95 each time when image forming is completed.

The post-processing mode is described in the following. In the printout mode, a sheet from the first sheet discharging port 35 is stored at the stack tray (first tray member 49) via the stack portion 37 without a binding process performed. In this case, sheets are overlapped and stacked on the stack portion 37 and a stacked sheet bundle is discharged to the stack tray (first tray member 49) with a jog completion signal from the main body controller 90.

In the staple binding processing mode, sheets from the first sheet discharging port 35 are stacked and collated on the stack portion 37 and the sheet bundle is stored on the stack tray (first tray member 49) after the binding process is performed thereon.

In this case, sheets on which images are to be formed are specified by an operator basically to have the same thickness and size. In the staple binding processing mode, any of the multi-binding, right corner binding, and left corner binding is selected and specified. The binding positions thereof are as described above.

In the jog sorting mode, sheets are divided into a group whose sheets having images formed at the image forming apparatus A are offset and stacked and a group whose sheets are stacked without being offset. An offset sheet bundle and a non-offset sheet bundle are alternately stacked on the stack tray.

[Manual Binding Mode]

The setting portion 77 where an operator sets a sheet bundle on which the binding process is to be performed is arranged at the apparatus front side of the external casing 73. A sensor to detect a set sheet bundle is arranged at the setting face 77b of the setting portion 77. With a signal from the sensor, the later-described post-processing controller 95 causes the stapling unit (first binding unit 47) to be moved to the manual binding position (first position). Subsequently, when an operation switch is depressed by an operator, the binding process is performed.

Thus, in the manual binding mode, the post-processing controller 95 and the main body controller 90 perform controlling offline. Here, in a case that the manual binding mode and the staple binding mode are to be performed concurrently, either mode is set to have priority.

[Post-Processing Controller]

The post-processing controller 95 causes the post-processing apparatus B to operate in accordance with the post-processing mode set by the main body controller 90. The illustrated post-processing controller 95 is structured with a control CPU (hereinafter, simply called a controller).

A ROM 96 and a RAM 97 are connected to the post-processing controller 95 (control CPU). The post-processing controller 95 performs the later-described sheet discharging operation with control programs stored in the ROM 96 and control data stored in the RAM 97. Here, drive circuits for all the abovementioned motors are connected to the post-processing controller 95 (control CPU), so that start, stop, and forward-reverse rotation of the motors are controlled thereby.

[Sheet Discharging Operation Mode]

At the controller (main body controller 90) for the image forming apparatus A, a post-processing (finishing) mode of image-formed sheets is set concurrently with image forming conditions. The illustrated apparatus is set to any of a staple binding mode, an eco-binding mode, a jog sorting mode, a bookbinding mode, a printout mode, an interruption mode, and a manual binding mode. In the following, operations of the respective modes will be described.

Figure 23:
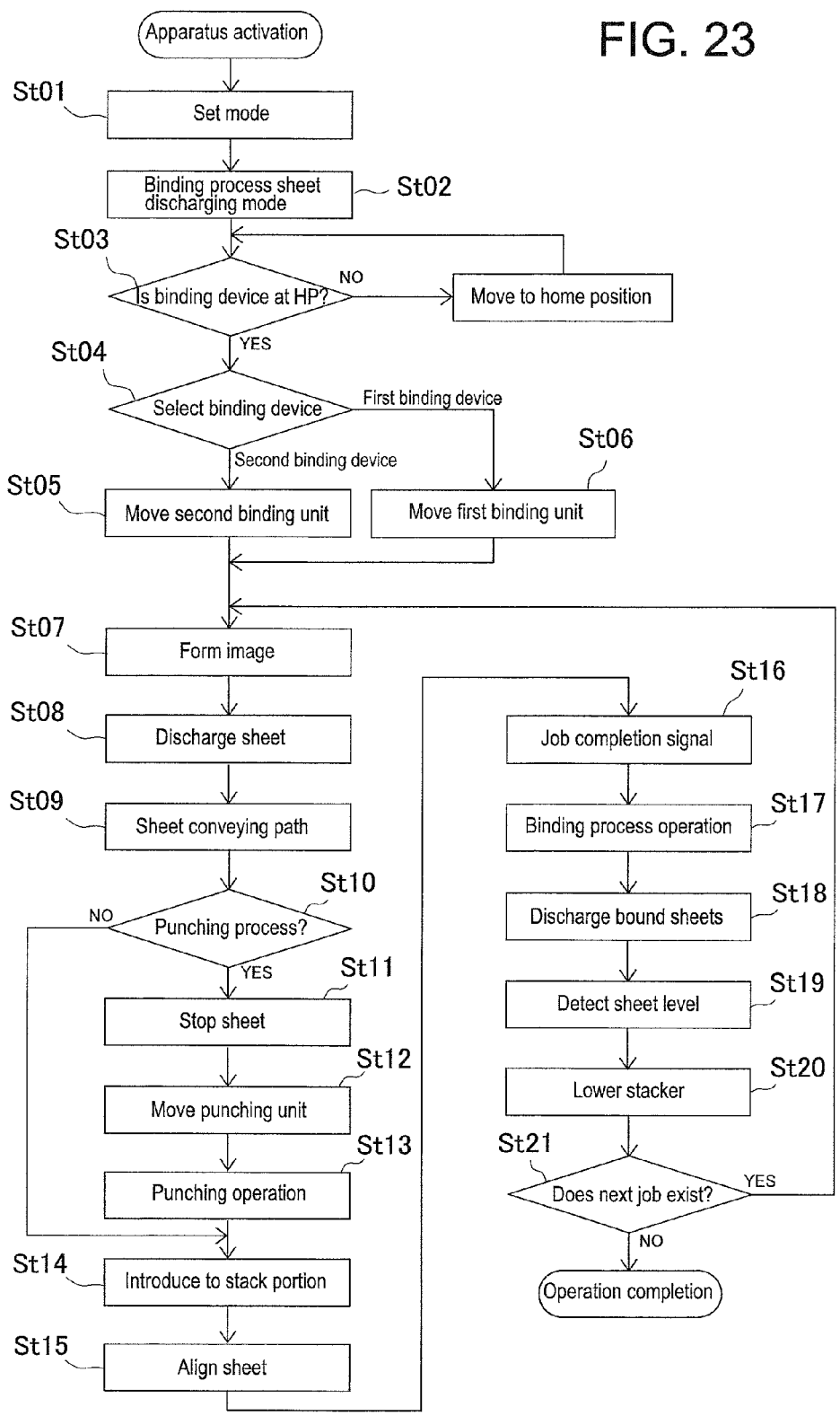
FIG. 23 is an operational flowchart of a binding process sheet discharging with the apparatus of FIG. 1

FIG. 23 is an explanatory view of operational flows to store a sheet bundle stacked on the stack portion 37 of the first processing portion B1 at the first tray member 49 at the downstream side after the sheet bundle is staple-bound or eco-bound.

Figure 24:
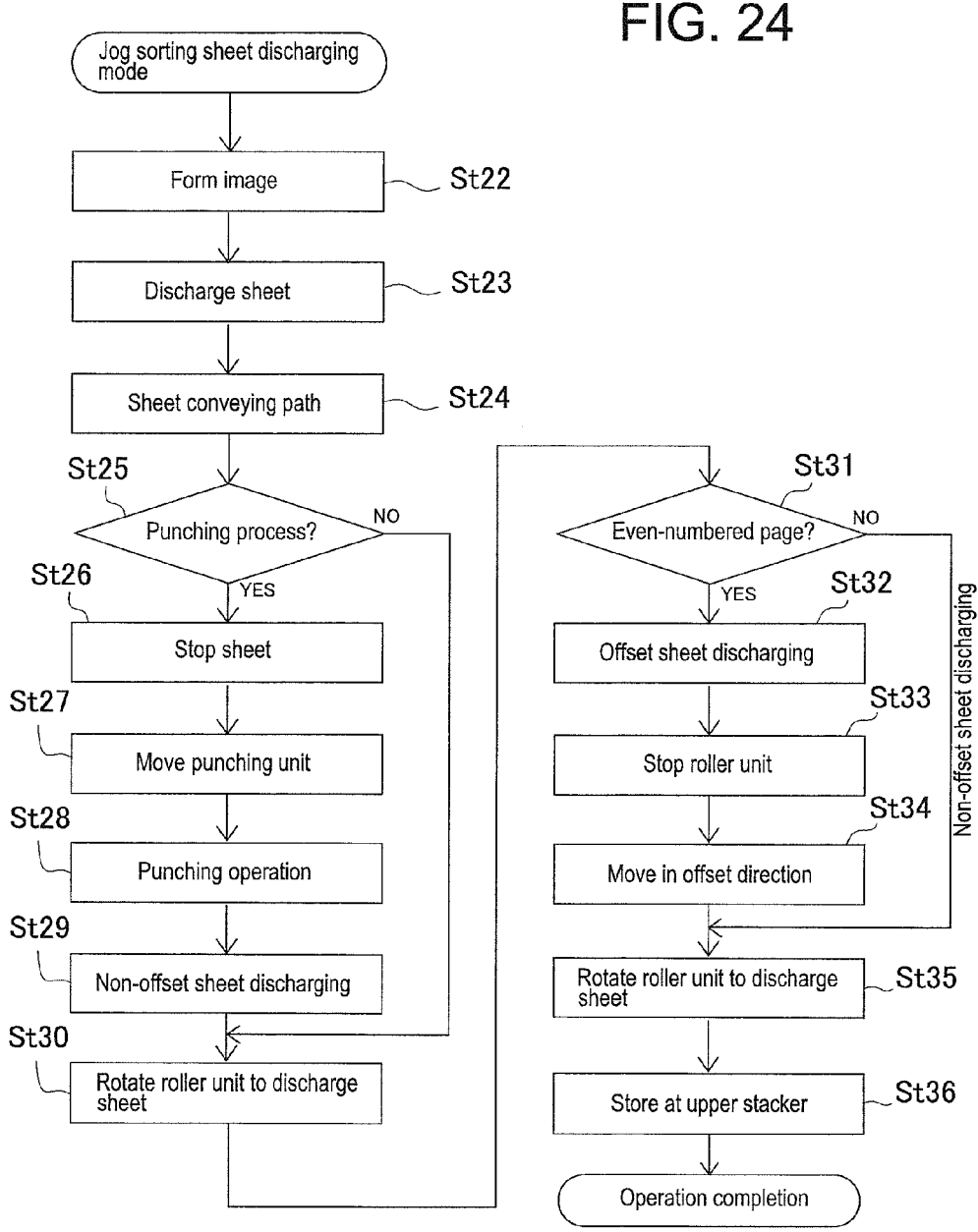
FIG. 24 is an operational flowchart of a jog sorting sheet discharging mode.

FIG. 24 is an explanatory view of a sheet discharging mode to perform jog-sorting on sheets for each bundle as being an explanatory view of operational flows to store at the third tray member 71 at the downstream side after sheets are offset in a direction perpendicular to the sheet discharging direction by a jog mechanism (roller shifting mechanism; not illustrated) of the third processing portion B3 (sheet introducing path).

Figure 25A:
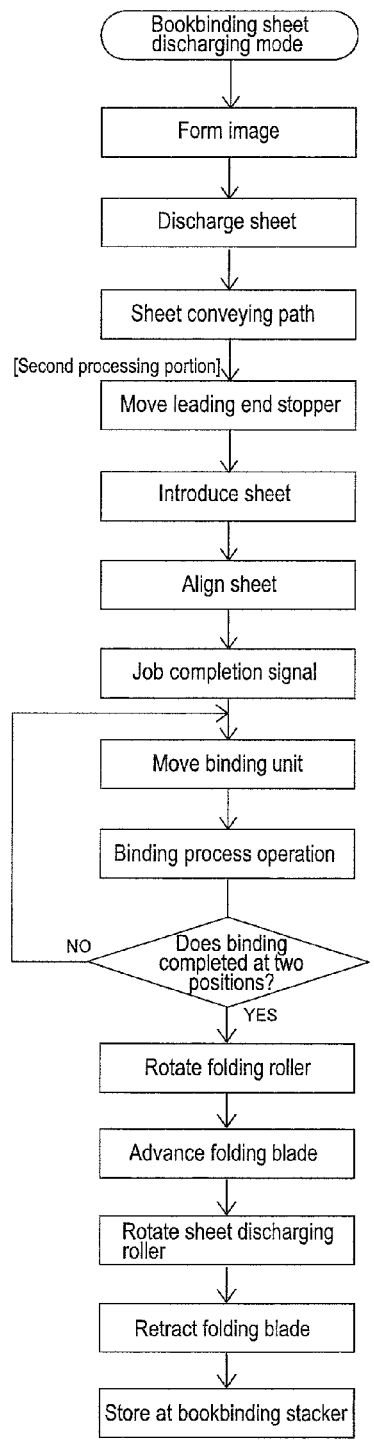
Figure 25B:
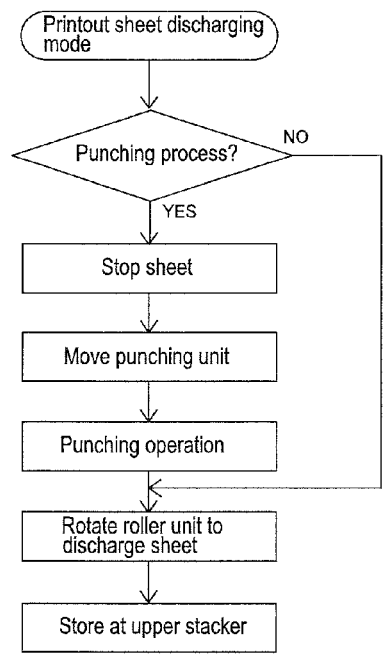

FIG. 25 is an explanatory view of the bookbinding sheet discharging mode to perform bookbinding finishing on sheets at the second processing portion B2.

[Staple Binding Mode and Eco-Binding Mode at First Processing Portion]

In the following, description is provided with reference to FIG. 23. Setting of the post-processing mode is performed with the input portion 93 (control panel) or the like of the image forming apparatus A (St01). Based on information of the post-processing mode setting (St02), the post-processing controller 95 for the sheet processing apparatus B causes the second binding unit 51 to be moved when the eco-binding process is specified (St05) and causes the first binding unit 47 to be moved when the staple binding process is specified (St06).

For performing the staple binding process, the first binding unit 47 is moved to the set binding position Cp1 and the second binding unit 51 is moved to the second waiting position Wp2. Here, when the binding unit position is set as a home position, the moving is performed after checking whether or not each binding unit is at the home position.

Next, the image forming apparatus A forms an image (St07) and the image-formed sheet is discharged (St08). The sheet processing apparatus B receives the image-formed sheet fed to the introducing port 26 and conveys to the downstream side (St09). When a punching process is specified at that time (St10), the post-processing controller 95 causes the sheet to temporarily stop at a punch position (St11).

Then, a punching unit 100 is moved in a direction perpendicular to the sheet discharging direction, the punching unit 100 is stopped after a specified punching position is determined with a sheet side edge detected by a sensor, and a punching operation is performed (St13).

When the punching process is not specified, the post-processing controller 95 causes the sheet to be received at the introducing port 26 and to be conveyed to the path sheet discharging port (first sheet discharging port). Then, the sheet is introduced to the stack portion 37 and positioned at a predetermined position by a positioning device (St15). The post-processing controller 95 causes sheets fed to the first sheet discharging port 35 to be stacked and stored on the sheet placement face 37a of the stack portion 37 (St07 to St15).

When a jog completion signal is received from the image forming apparatus A (St16), the post-processing controller 95 transmits a binding process instruction signal to the first binding unit 47 or the second binding unit 51. Accordingly, the first binding unit 47 or the second binding unit 51 performs the binding process (St17).

When the post-processing controller 95 receives a binding process completion signal from the first binding unit 47 or the second binding unit 51, the bound sheet bundle is stored onto the first tray member 49 at the downstream side by the sheet bundle discharging mechanism (St18).

A sheet level detection sensor (not illustrated) is arranged at the first tray member 49 and detects a stacked-sheet height. When the detection value exceeds a predetermined height, the first tray member 49 is lowered (St20). Subsequently, the post-processing controller 95 determines whether or not a next job exists (St21) and the operation is completed.

Next, the jog sorting sheet discharging mode will be described with reference to FIG. 24. When the punching process is specified (St25), the post-processing controller 95 causes a sheet fed to the sheet introducing port 26 of the sheet conveying path 28 (St22 to St24) to temporarily stop at the punching position (St26). Then, the punching unit 100 is moved in a direction perpendicular to the sheet discharging direction (St27), the punching unit 100 is stopped after a specified punching position is determined with a sheet side edge detected by the sensor, and the punching operation is performed (St28).

Subsequently, the post-processing controller 95 causes a roller unit to be rotated in the sheet discharging direction (St30) to discharge a sheet from the third sheet conveying path 30 to the third tray member 71 (St29). When the sheet is at an even-numbered page (St31, St32), the roller unit which is arranged at the second sheet discharging port is stopped (St33) and the sheet is moved in a nipped state in a direction perpendicular to the sheet discharging direction by a previously-set offset amount (St34).

Then, the post-processing controller 95 causes the roller unit which is arranged at the second sheet discharging port to be rotated again in the sheet discharging direction (St35). At that time, the first path switching device 33 is shifted to guide the sheet from the introducing port 26 to the third sheet conveying path 30 and the sheet is stacked on the third tray member 71 (St36).

Next, the bookbinding sheet discharging mode will be described with reference to FIG. 25. Similarly to the above, an image-formed sheet is introduced to the sheet conveying path 28. The sheet is guided from the introducing port 26 to the second processing portion B2 and is abutted and regulated by the leading end regulating stopper 67. At that time, the post-processing controller 95, in advance, receives information of sheet size in the sheet discharging direction and sets a position of the leading end regulating stopper 67.

With a job completion signal from the image forming apparatus A, the center-binding stapling unit 63 is moved to the sheet center and performs a binding process on sheets stacked at the second processing portion B2. When the binding process is completed at one position or two positions, the sheet bundle is moved to a folding position and a pair of folding rollers 64 are rotated. At the time when a folding blade 65 is advanced in the folding direction and the pair of folding rollers 64 are rotated by a predetermined amount, the folding blade 65 is retracted. Then, the folded-sheets are discharged in the sheet discharging direction by a sheet folding discharging roller 69 at the downstream side and stored at the second tray member 61.

What is claimed is:

1. A sheet processing apparatus, comprising:
    a setting portion to which a sheet bundle is set from an outside of the apparatus;
    a binding unit which performs a binding process on a sheet bundle which has been set at the setting portion;
    a stack portion on which sheets conveyed from a sheet conveying portion are stacked; and
    a moving portion including a guide member which guides the stack portion to be movable, and a driving device which moves the stack portion along the guide member,
    wherein at least one of the guide member and the driving device is arranged as being overlapped to the setting portion in a direction of intersecting with a conveying direction of a sheet conveyed by the sheet conveying portion.

2. The sheet processing apparatus according to claim 1, wherein the setting portion includes an opening to receive sheets, a setting face to support sheets inserted through the opening, and a position regulating face to perform regulation with abutting against end edges of sheets inserted along the setting face, and
    at least one of the setting face and the position regulating face is arranged as being overlapped to at least one of the guide member and the driving device in the intersecting direction.

3. The sheet processing apparatus according to claim 1, wherein the guide member is arranged at a support frame located at both sides of the stack portion, and
    the setting portion is arranged above the support frame.

4. The sheet processing apparatus according to claim 1, further comprising a processing portion on which sheets conveyed from the sheet conveying device are stacked,
    wherein the binding unit is arranged to be movable between a first position where the binding process is performed on a sheet bundle which has been set at the setting portion and a second position where the binding process is performed on a sheet bundle which has been stacked on the processing portion.

5. The sheet processing apparatus according to claim 4, wherein a sheet bundle manually inserted from the outside of the apparatus is set to the setting portion.

6. The sheet processing apparatus according to claim 5, wherein the processing portion is arranged at a position different from the setting portion.

7. The sheet processing apparatus according to claim 5, wherein the moving portion lifts the stack portion.

8. The sheet processing apparatus according to claim 6, wherein the moving portion lifts the stack portion.

9. The sheet processing apparatus according to claim 4, wherein the processing portion is arranged at a position different from the setting portion.

10. The sheet processing apparatus according to claim 4, wherein the moving portion lifts the stack portion.

11. An image forming system, comprising:
    an image forming apparatus which forms an image on a sheet; and
    a post-processing apparatus which performs a post-process on a sheet fed from the image forming apparatus,
    wherein the post-processing apparatus is the sheet processing apparatus according to claim 1.

12. The sheet processing apparatus according to claim 1, wherein a sheet bundle manually inserted from the outside of the apparatus is set to the setting portion.

13. The sheet processing apparatus according to claim 1, wherein the moving portion lifts the stack portion.

* * * * *